US007039280B2

(12) United States Patent
Hata et al.

(10) Patent No.: US 7,039,280 B2
(45) Date of Patent: May 2, 2006

(54) EMBEDDED TYPE OPTICAL ISOLATOR AND METHOD FOR MANUFACTURING THE SAME

(75) Inventors: Kenjiro Hata, Tokyo (JP); Yoshinori Sato, Tokyo (JP)

(73) Assignee: TDK Corporation, Tokyo (JP)

( * ) Notice: Subject to any disclaimer, the term of this patent is extended or adjusted under 35 U.S.C. 154(b) by 316 days.

(21) Appl. No.: 10/242,110

(22) Filed: Sep. 12, 2002

(65) Prior Publication Data
US 2003/0053208 A1    Mar. 20, 2003

(30) Foreign Application Priority Data

| Sep. 17, 2001 | (JP) | ............................. 2001-281251 |
| Oct. 1, 2001 | (JP) | ............................. 2001-305168 |
| Nov. 15, 2001 | (JP) | ............................. 2001-349816 |

(51) Int. Cl.
*G02B 6/42* (2006.01)
*G02B 5/30* (2006.01)

(52) U.S. Cl. ............................. 385/50; 385/27; 385/31; 385/51; 385/52; 385/72; 385/73; 385/84; 385/85; 385/88; 385/92; 359/484

(58) Field of Classification Search ................. 359/484; 385/56, 58, 60, 66, 70, 72–73, 140, 39, 51, 385/50

See application file for complete search history.

(56) References Cited

U.S. PATENT DOCUMENTS

| 5,267,342 A | * | 11/1993 | Takahashi et al. ........... 385/140 |
| 6,485,191 B1 | * | 11/2002 | Sato .............................. 385/73 |
| 6,816,652 B1 | * | 11/2004 | Lin et al. ....................... 385/39 |

* cited by examiner

*Primary Examiner*—Frank G. Font
*Assistant Examiner*—Michael P. Mooney
(74) *Attorney, Agent, or Firm*—Drinker Biddle & Reath LLP

(57) ABSTRACT

Optical isolator comprises a ferrule having a through-hole in which an optical fiber is inserted and a groove formed in the ferrule with the optical fiber inserted in the through-hole; and a composite assembly consisting of an optical isolator element composed of a Faraday rotator and a pair of polarizers fixed on opposite surfaces of the Faraday rotator in such manner that the angle between the directions of polarization of the polarizers is at about 45° and a structure reinforcing member having a thickness of filling the groove and surrounding the optical element, said composite assembly being inserted in the groove as a unit. The reinforcing member may be made of the same material as the outer support or formed by a magnet for applying a magnetic field to the Faraday rotator. The isolator element, the magnet and the outer support may have respective reference sides or planes so that the plane of polarization of the incident side of the isolator element is easily determined with respect an outer base or support. Also, the groove portion of the support is mechanically strengthened by the magnet surrounding the optical element.

13 Claims, 15 Drawing Sheets

2a, 1, 2b (a)

(b)

(a)

(b)

EMBEDDED TYPE OPTICAL ISOLATOR AND METHOD FOR MANUFACTURING THE SAME

BACKGROUND OF THE INVENTION

1. The Field of the Invention

The present invention relates to optical devices such as isolators, optical attenuators and optical filters for use in the fields of optical communication, optical measurement and other optical applications.

2. Related Art

It is known that semiconductor lasers used as light sources for various optical systems become unstable in their oscillation by return lights from the optical systems connected to the semiconductor lasers. To prevent this, optical isolators are widely used. With the rapid expansion of optical communication systems in recent years, demand for production of compact isolators at a low cost is more and more increasing.

The basic construction of the conventional optical isolator is depicted in FIG. 6 which includes a Faraday rotator 11, a pair of polarizers 10a and 10b arranged on opposite sides of the Faraday rotator 11, and a magnet 12 disposed around the Faraday rotator for magnetizing the Faraday rotator 11. A pair of collimator lenses 9a and 9b are disposed between the polarizers and optical fibers 8a and 8b, respectively. With this construction, the light incident in the forward direction (the direction of arrow C in the figure) passes through the optical isolator and the light incident in the reverse direction (the direction of arrow D in the figure) is cut off whereby the function as an isolator is materialized but this conventional structure requires many optical parts and the overall size was large.

On the other hand, another conventional optical isolator was proposed to avoid such complicated structure by adopting simplified optical parts such as optical isolators, optical attenuators or optical filters embedded in substrate plates.

These optical parts are called "embedded type" optical parts and are each produced by embedding an optical fiber in a substrate, fixing it with a resin, cutting a groove in the substrate transversely across the optical fiber with a dicing saw or other means, inserting an optical element into the groove and fixing it with an adhesive. This construction attains an advantage of eliminating the necessity of aligning the light beam axes each other in the manufacturing of the optical isolators and thus the production is facilitated On the other hand, there is a drawback in this type that diffraction of light occurs when the light exiting from the optical fiber passes through the optical element and the insertion loss becomes large due to the required thickness of the optical element. To cope with this problem, another conventional optical isolator was proposed to enlarge the core diameter of the optical fiber by locally heating the optical fiber in order to reduce the diffraction.

In order to materialize the optical isolator disclosed in the above-mentioned patent publication, a TEC fiber which is a core enlarged optical fiber produced by locally heating the fiber is embedded in position in a capillary ferrule as an optical fiber-supporting member. Thereafter, the opposite end surfaces of the capillary ferrule are subjected to PC finishing and a groove for embedding the optical isolator element composed of a Faraday rotator and a pair of optical polarizers bonded on opposite surfaces of the rotator is formed by cutting the ferrule through the enlarged core portion transversely of the optical fiber. It is necessary for the optical isolator inserted in the groove has a size larger than the mode field diameter but as the mode field diameter at the groove is about several tens μm, it is sufficient that the size of the element is at least 100 μm. The size is desirably as small as possible in order to reduce the cost of the elements by obtaining multiple optical elements from the same stock of materials.

When a small optical element is inserted in the groove, a large void space remains in the groove around the element and the space is filled with an adhesive and the optical element is thus covered by the adhesive. Accordingly, there was a problem that the curing shrinkage of the adhesive or external thermal shock the adhesive tends to be deteriorated, leading to peeling of the adhesive from where a large amount of the adhesive is present. Also, it was not easy to position such small element at a proper location and bond it in position.

Accordingly, the present invention aims at providing an optical isolator which is easy to handle and has a high reliability.

Since embedded type optical isolator which uses polarizer glass is of polarization-dependent type, it is necessary to adjust the direction of the polarization of the incident light when the optical isolator is used for a LD module. This adjustment requires tools and apparatus as well as a number of steps, leading to increase in the cost of assembling the LD module. Although there is a method of indicating the position of light incidence plane with an ink or laser marker, the precision of such marking and positioning becomes low due to the compact size of the parts and thus a precise alignment of the incident plane of polarization is difficult to achieve.

Further, with general optical isolator, the surface of the optical element is inclined with respect to the light beam axis as a measure to remove the return light reflected from the incident surface of the optical and to compensate for the inherent deviation of the position of the outgoing light from the incident light. However, in the embedded type optical isolator, the inclined rectangular groove in which the optical element is inserted increases the light connection loss.

A larger angle of the inclination of the groove in which the optical element is inserted is required for a less return light but this measure leads to a greater connection loss. Accordingly, it is necessary to calculate the required reflection reduction and the allowable connection loss in design and to machine a groove with a best precision satisfying these factors.

However, when the groove machining is carried out using a diamond blade, one encounters a problem that the blade tends to walk or be deviated when the blade contacts the work (ferrule) as well as when the blade comes out of the work, with the result that the groove is dulled to an extent that a truncated trapezoid (divergent upwardly) in cross section is formed.

Further, the side wall surface of the groove on which the light is incident has a larger surface roughness because it has been cut by the diamond blade, and thus fine voids are likely to be trapped between the cut surface and the optical element to be embedded when the optical element is inserted in the groove and bonded with an adhesive, thereby causing a loss and reflection. Accordingly, it is necessary to mirror-finish the side walls of the groove.

As a method for finishing the cut side wall surfaces, so-called "float slicing" method is available, which comprises steps of simultaneously cutting and grinding the surfaces while supplying a lapping liquid (containing cerium oxide, colloidal silica, etc) to the cutting wheel and the work. However, this process enlarges the width of the grooves at the upper portion of the side walls of the groove to an larger extent larger as compared with the diamond blade cutting method.

Thus, the grooves obtained by this method is deviated from the designed cross section and thus there is a possibility that the reflection reduction and the connection loss are aggravated.

Explaining this problem in reference to FIGS. 7(a) and (b), which illustrate one method, even if a groove 23 in which an optical element is to be embedded is machined in a ferrule 20 supporting an optical fiber 21 therein with a desired angle of inclination as seen in the plan view of (a), angles θ1 and θ2 (usually θ1=θ2) of the side walls 25, 27 of the groove 23 formed by the machining fluctuation are introduced as seen from the lateral view of (b), which lead to a larger connection loss due to the larger angles than originally designed.

When a ferrule capillary having a function of optical fiber connector is used as a support for a terminal enlarged core (TEC) optical fiber and an optical element, the grooved portion of the ferrule capillary is physically weak and, especially when it is expected that the ferrule is repeatedly mounted and dismounted, it is difficult to use it as an optical connector. Thus, another object of the present invention is to improve the strength of the grooved portion of the ferrule capillary and providing an optical part having a structure capable of withstanding the repeated mounting and dismounting.

SUMMARY OF THE INVENTION

The present invention solves the problems by a compact and reliable optical isolator which comprises an outer support having a through-hole in which an optical fiber is inserted and a groove formed in the support with the optical fiber inserted in the through-hole; and a composite assembly consisting of an optical element (optical isolator element) composed of a Faraday rotator and a pair of polarizers fixed on opposite surfaces of the Faraday rotator in such manner that the angle between the directions of polarization of the polarizers is at about 45° and a structure reinforcing member (reinforcing member) having a thickness of filling the groove and surrounding the optical element, said composite assembly being inserted in the groove as a unit. Here, the reinforcing member may be made of the same material as the outer support or formed by a magnet for applying a magnetic field to the Faraday rotator.

The optical isolator according to the present invention requires only a minimum amount of an adhesive for fixing the optical element in the groove of the outer support and thus the deterioration such as peeling of the adhesive due to curing shrinkage of the adhesive and external thermal shock is prevented whereby a stable optical isolator can be provided.

Further, since the optical isolator according to the present invention is inserted into the groove of the outer support as a composite assembly composed of the optical element consisting of the Faraday rotator and the polarizers and the reinforcing member surrounding the optical element, a precise positional adjustment of the optical fiber, the polarizers and the Faraday rotator is not necessary, so that the positional alignment of the members is simplified to a large extent.

Also, according to the structure of the present invention, the distance between the optical fibers is short and thus the collimator lenses are dispensed with and the optical isolator is made compact in size.

In addition, by adjusting and bonding large size polarizers and a large size Faraday rotator, a number of elements can be cut out from the adjusted and bonded assembly and thus a mass production is made possible. Moreover, the area through which the light beam passes is very small, the size of the optical element composed of the polarizers and the Faraday rotator may also be made small and by embedding them in the groove together with the reinforcing member surrounding the optical element, a very compact optical isolator of a high reliability is realized.

Also, in the present invention, an optical element having polarizer glass used for an embedded type optical isolator has an incident plane of polarization at a predetermined angle with respect to a reference side of the optical element, and in order to transmit (inform) said angle of incident plane of polarization of the optical element to the reference member (such as LD) via the ferrule and the magnet, a groove having a rectangular cross section is formed in the magnet in parallel with a reference side of the magnet in the form of a rectangle in cross section and the optical element is inserted into this groove of the magnet.

With this construction, the reference side of the magnet is then located on a holder surface of a reference member to constitute an embedded type optical isolator having a predetermined incident plane of polarization is obtained.

More particularly, the present invention provides a polarization-dependent embedded type optical isolator wherein an optical element composed of polarizer glass plates and a Faraday rotator is embedded and fixed in an embedding groove of a ferrule capillary having optical fibers in alignment with the optical fibers, and a permanent magnet for applying a magnetic field to the Faraday rotator is disposed around the optical element, characterized in that the optical element is formed into a rectangular parallelepiped (containing cube) having a reference side, the permanent magnet is provided with a rectangular groove into which the optical element is to be inserted in such manner that the reference side of the optical element can be positioned in the groove and the permanent magnet is further provided with a reference side substantially parallel with the bottom of the rectangular groove, said reference side of the optical element is inserted and fixed in the rectangular groove of the permanent magnet, the permanent magnet having the optical element inserted in the rectangular groove is inserted and fixed in the embedding groove of the ferrule capillary, and the reference side of the permanent magnet is inserted in a rectangular holding groove of a holder member having a reference side substantially parallel with the bottom of the holding groove.

The present invention also positions a ferrule capillary having a groove for insertion of an optical element on a predetermined location of a reference plate and positions and fixes the optical element in the groove by utilizing the bottom side of the groove and a reference side of the optical element.

More specifically, the present invention provides a polarization-dependent embedded type optical isolator wherein an optical element composed of polarizer glass plates and a Faraday rotator is embedded and fixed in an embedding groove of a ferrule capillary having optical fibers in alignment with the optical fibers, and a permanent magnet for applying a magnetic field to the Faraday rotator is disposed around the optical element, characterized in that the ferrule capillary having the optical fibers bonded to the ferrule capillary is located in position on a base plate, a rectangular groove for insertion of the optical element is formed in the ferrule capillary at a predetermined position and at a predetermined angle, using the surface of the base plate as a reference, the optical element is in the form of rectangular parallelepiped, one side of the rectangular parallelepiped forms a reference side, the optical element is inserted in the groove of the ferrule capillary with the reference side abutting the bottom of the groove to position the optical element, whereby the incident direction or plane of polarization of the optical element is in a predetermined relation with the bottom surface of the base plate.

In this case, an assembly consisting of the optical element of rectangular parallelepiped shape fixed in the rectangular groove of the magnet may be inserted in the rectangular groove of the ferrule capillary and the reference side of the optical element or the reference side of the magnet which has a specific relationship with the reference side of the optical element is abutted against the bottom of the groove of the ferrule capillary so as to obtain a precise positioning so that the direction or plane of polarization on the incident side of the optical element is in a predetermined relation with the bottom surface of the base plate.

According to this mode, not only the precise alignment of the direction of the polarization of the incident side but also the assemblage of the optical isolator are achieved and a low cost glass plate can be used as the reference base plate.

On the other hand, the problem of deterioration of reflection attenuation and connection loss due to formation of trapezoidal shape (divergent upwardly) of the groove as above-mentioned is solved by an embedded type optical isolator according to the present invention characterized in that the light incident side of the groove formed in the ferrule capillary for embedding the permanent magnet is made oblique or inclined with respect to the direction of the depth of the groove.

The present invention further provides a method for producing a polarization-dependent embedded type optical isolator, which comprises laminating and bonding together a first polarization glass plate having a surface layer containing oriented fine metal particles and having an incident plane of polarization at a predetermined angle with respect to a reference side, a Faraday rotator having an angle of rotation of about 45° and a second polarization glass plate having a surface layer containing oriented fine metal particles and having a plane of polarization at an angle of about 45° with respect to the plane of polarization of the first polarization glass plate with the layers containing fine metal particles facing the Faraday rotator to form a laminate; grinding off the incident side of the first polarization glass plate and the exit side of the second polarization glass plate up to the planes close to the layers containing oriented fine metal particles; dicing the laminate into desired rectangular parallelepiped pieces including a side having specific relationship with said reference side; each of the resulting thin rectangular parallelepiped elements is embedded in a groove of a permanent magnet.

According to another aspect of the present invention, the present invention provides a method for producing a polarization-dependent embedded type optical isolator, which comprises alternately laminating and bonding together a first polarization glass plate having on opposite surfaces surface layers containing oriented fine metal particles and having an incident plane of polarization at a predetermined angle with respect to a reference side, a Faraday rotator having an angle of rotation of about 45° and a second polarization glass plate having on opposite surfaces surface layers containing oriented fine metal particles and having a plane of polarization at an angle of about 45° with respect to the plane of polarization of the first polarization glass plate and repeating the lamination until a desired number of lamination is reached; slicing the resulting laminate in the direction of lamination at given intervals to obtain a plurality of optical element arrays; inserting and bonding each array into a groove of a permanent magnet; and removing middle portion of each of the first and second polarizer plate between the both surface layers containing oriented fine metal particles together with a part of the magnet.

According to another aspect of the present invention, the present invention provides a method for producing a plurality of polarization-dependent embedded type optical isolators embedded in ferrules, which comprises alternately laminating and bonding together a first polarization glass plate having on opposite surfaces surface layers containing oriented fine metal particles and having an incident plane of polarization at a predetermined angle with respect to a reference side, a Faraday rotator having an angle of rotation of about 45° and a second polarization glass plate having on opposite surfaces surface layers containing oriented fine metal particles and having a plane of polarization at an angle of about 45° with respect to the plane of polarization of the first polarization glass plate, repeating the lamination until a desired number of lamination is reached; slicing the resulting laminate in the direction of lamination at given intervals to obtain a plurality of optical element arrays; inserting and bonding the plurality of arrays into a plurality of grooves of a permanent magnet respectively; removing middle portion of each of the first and second polarizer plates between the opposite surface layers containing oriented fine metal particles together with a part of the magnet; embedding and fixing the resulting bar magnet having a plurality of optical elements each composed of the first and second polarizer glass plates and a Faraday rotator in a groove formed in a plurality of ferrules in which an optical fiber is embedded; and thereafter cutting the bar magnet at positions between the ferrules.

According to a further aspect of the invention, the present invention provides an embedded type optical device including an outer support such as ferrule capillary having a through-hole in which an optical fiber is inserted and bonded, at least one end surface of the outer support being polished so that the end surface functions as a connector to connect the outer support to an optical fiber ferrule, a groove formed in the outer support transversely across the optical fiber, and an optical element having various functions being embedded in the groove, characterized in that peripheral portion of the groove having the optical element embedded therein is covered and supported by an outer supporting member for the ferrule capillary.

With this construction, an embedded type optical device having a optical connector function is provided which can withstand repeated attachment and detachment.

According to one aspect, the present invention provides an optical element-embedded type optical device including a ferrule capillary having a through-hole in which an optical fiber is inserted and bonded, at least one end surface of the ferrule capillary being polished so that the end surface functions as a connector to connect the ferrule capillary to another optical fiber ferrule, a groove formed in the ferrule capillary transversely across the optical fiber, and an optical element having various functions embedded in the groove, an optical cable having another optical fiber, an outer supporting member having a through-bore for supporting one end portion of the optical fiber ferrule and one end portion of the optical cable fitted in the through-bore, characterized in that the one end portion of the optical fiber ferrule is covered and supported at periphery of the groove having the optical element embedded therein by the inner wall of the through-bore of the outer supporting member.

According to a further aspect, the present invention provides an embedded type optical device including a ferrule capillary having a through-hole in which an optical fiber is inserted and bonded, both end surfaces of the ferrule capillary being polished so that the end surfaces function as connectors to connect the ferrule capillary to other two optical fiber ferrules, a groove being formed in the ferrule capillary transversely across the optical fiber, and an optical element having various functions being embedded in the groove, an outer supporting member having a through-bore for supporting and connecting end portions of the ferrule capillary and end portions of the other two optical fiber ferrules in the through-bore, a pair of slit resilient sleeves in alignment with the through-bore for supporting the end portions of the other two optical fiber ferrules and the ferrule capillary is covered and supported at periphery of the groove having the optical element embedded therein by the inner wall of the bore of the outer supporting member.

According to yet further aspect, the present invention provides an optical element-embedded type optical device including an optical fiber ferrule having a through-hole in which an optical fiber is inserted and bonded, one end surface of the ferrule being polished so that the end surface functions as a connector to connect the optical fiber ferrule to a second optical fiber ferrule, a groove being formed in the optical fiber ferrule transversely across the optical fiber, an optical element having various functions embedded in the groove, and a housing having a through-bore for fitting and supporting one end portion of the optical fiber ferrule, and a semiconductor laser source connected with the optical fiber in the optical fiber ferrule, characterized in that the one end of the optical fiber ferrule is covered and supported at periphery of the groove having the optical element embedded therein by the inner wall of the through-bore of the housing.

BRIEF DESCRIPTION OF THE DRAWING

FIG. 1 shows a cross section viewed from above of the optical isolator according to Example 1.
FIG. 2 shows a cross section viewed from lateral of the optical isolator according to Example 1.
FIG. 3 shows a cross section of the outer supporting member according to the present invention.
FIG. 4 shows a cross section viewed from above of the optical isolator of Example 2 in which a magnet is embedded.
FIG. 5 shows a cross section viewed from lateral of the optical isolator in which a magnet is embedded
[FIG. 6]

FIG. 9 illustrates manufacturing procedures according to Example 3, including steps (a)–(j), and shows the structure of the resultant optical isolator.
FIG. 10 illustrates manufacturing procedures according to Example 4, including steps (a)–(k), and shows the structure of the resultant optical isolator.
FIG. 11 illustrates the first half of manufacturing procedures according to Example 5, including steps (a)–(i).
FIG. 12 illustrates the second half of manufacturing procedures according to Example 5, including steps (j)–(n), and shows the structure of the resultant optical isolator.
FIG. 13 shows a cross section of a laser device in which the optical isolator of the present invention is installed.
FIG. 14 illustrates the first half of manufacturing procedures according to Example 6, including steps (a)–(i).
FIG. 15 illustrates the second half of manufacturing procedures according to Example 6, including steps (j)–(o), that follow the steps shown in FIG. 14, and shows the structure of the resultant optical isolator.
FIG. 16 illustrates the second half of manufacturing procedures according to Example 7, including steps (a)–(e), and shows the structure of the resultant optical isolator.
FIG. 17 shows a cross section of the optical isolator element-embedded type optical part according to Example 8.
FIG. 18 shows a cross section of the optical isolator element-embedded type optical part according to Example 9.
FIG. 19 shows a cross section of the optical isolator element-embedded type optical part according to Example 10.
FIG. 20 shows a cross section of an LD module in which the optical isolator element-embedded type optical part shown in FIG. 19 is installed.

The optical isolator of the present invention will be explained with reference to the attached drawings. It should be understood that the present invention will be applied not only to optical isolators, but also to optical parts comprising an optical element (such as an optical attenuator and an optical filter), an optical fiber and an outer support member, such as a ferrule capillary, in which the element and the optical fiber are embedded.

EXAMPLE 1

Figure 1:
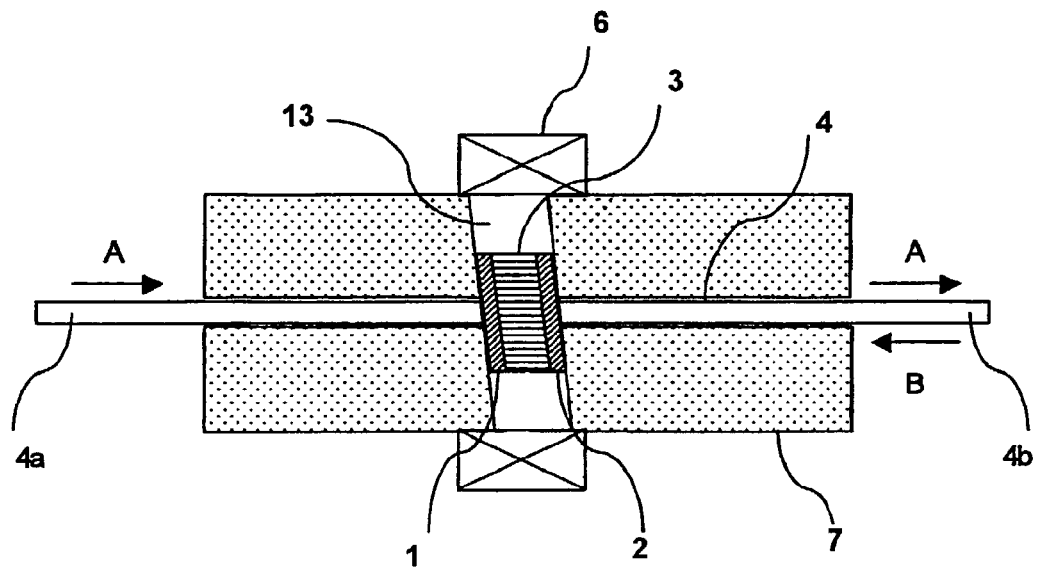
[FIG. 1]
Figure 2:
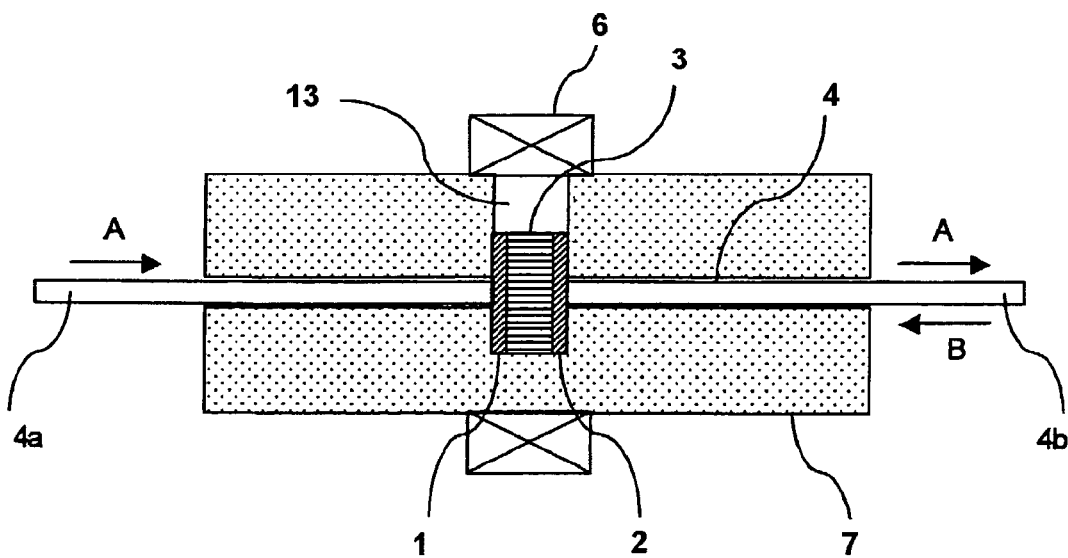
[FIG. 2]

FIGS. 1 and 2 show a cross section viewed from above and a cross section viewed from lateral, respectively, of a first embodiment of the present invention. For an outer supporting member 7 having a through-hole, a ferrule made of zirconia, crystalline glass and the like, can be used. In the through-hole, an optical fiber 4 is inserted and bonded, and then a groove 13 is cut in the outer supporting member 7 transversely across the optical fiber. This groove can be formed easily with a dicing saw, a slicer or the like. The groove can be inclined at a predetermined angle with respect to the light beam axis of the optical fiber 4 (as shown in FIG. 1), so as to remove return lights. The formation of the groove 13 splits the optical fiber 4 into 4a and 4b. It should be noted that, when the mode field diameter at the split portion of the optical fiber is enlarged by heat treatment or the like prior to the groove formation, the connection efficiency of the optical fiber is increased, leading to reduction of the connection loss.

In the groove 13, an optical isolator element is inserted, bonded and fixed.

The optical isolator element consists of a Faraday rotator 3 and a pair of polarizers 1 and 2 bonded on opposite sides of the rotator. For the Faraday rotator 3, YIG, Bi-substituted rare-earth garnet or the like is used. The thickness thereof is adjusted so that the rotator has an angle of rotation of 45° when a magnetic field is applied. The polarizers 1 and 2 are arranged so that the angle between their directions of the polarization becomes 45°, and bonded on the both sides of the Faraday rotator 3 with an optical adhesive. Since the mode field diameter at the groove 13 is about several tens µm, it is sufficient that the size of the optical element consisting of the Faraday rotator 3 and a pair of polarizers 1 and 2 is about several hundreds µms. Because of this small size, when cutting out the requisite size, multiple optical elements can be obtained using a dicing saw or the like.

Figure 3:
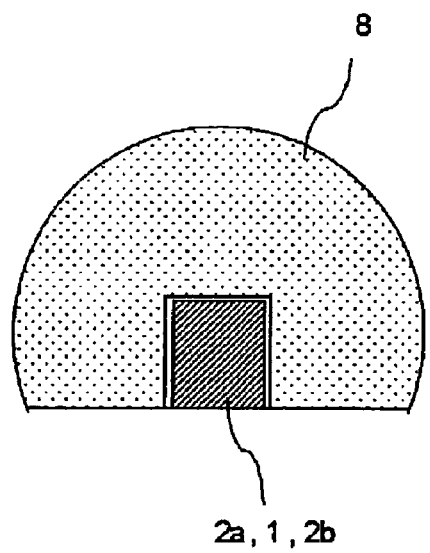
[FIG. 3]

The width of the groove 13 is made slightly larger than the thickness of the optical element consisting of the Faraday rotator 3 and the polarizers 1 and 2 so that the optical element can be tightly fit into the groove. With this construction, the cut-out optical element is positioned on the light beam axis simply by inserting the element in the center portion of the groove 13, without needing precise positional adjustment. The optical element is fixed to the position by injecting an optical adhesive into the area around the optical element. The size of the optical element is smaller than the cross section of the groove. Therefore, as shown in FIG. 3, there is a space for a reinforcing member 8 having thermal-deformation resistance and stability, which member is made of the same material as the outer supporting member 7 or a different material (as will be described below, it may be a magnet), in such manner that it surrounds the element and it has the same shape as that of the cross section of the groove. When the element with this reinforcing member is embedded in the groove, embedding process is simplified and the deformation of the groove portion can be suppressed, thereby improving reliability.

EXAMPLE 2

This Example shows a modified embodiment of Example 1.

Figure 4:
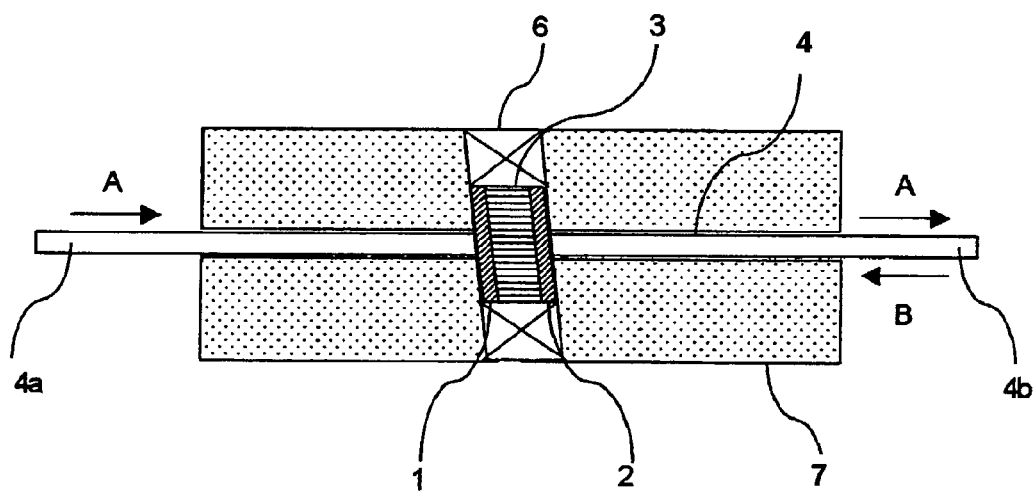
[FIG. 4]
Figure 5:
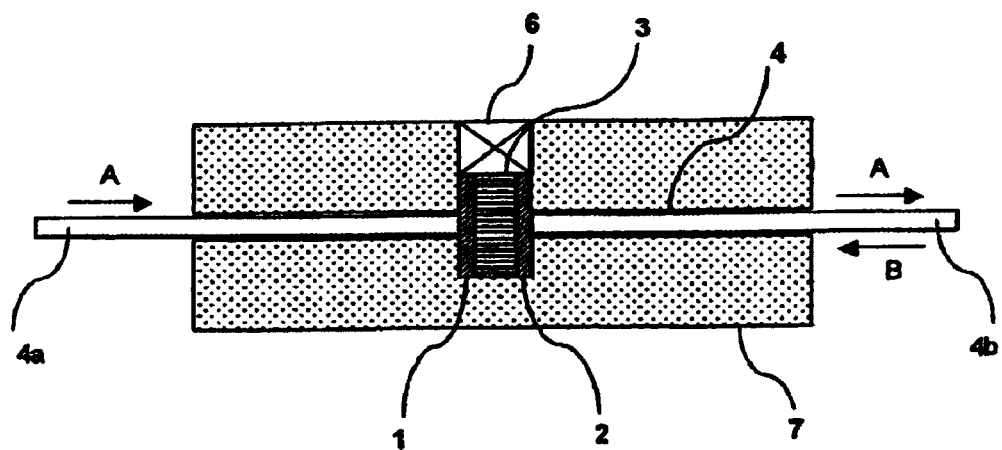
[FIG. 5]
Figure 6:
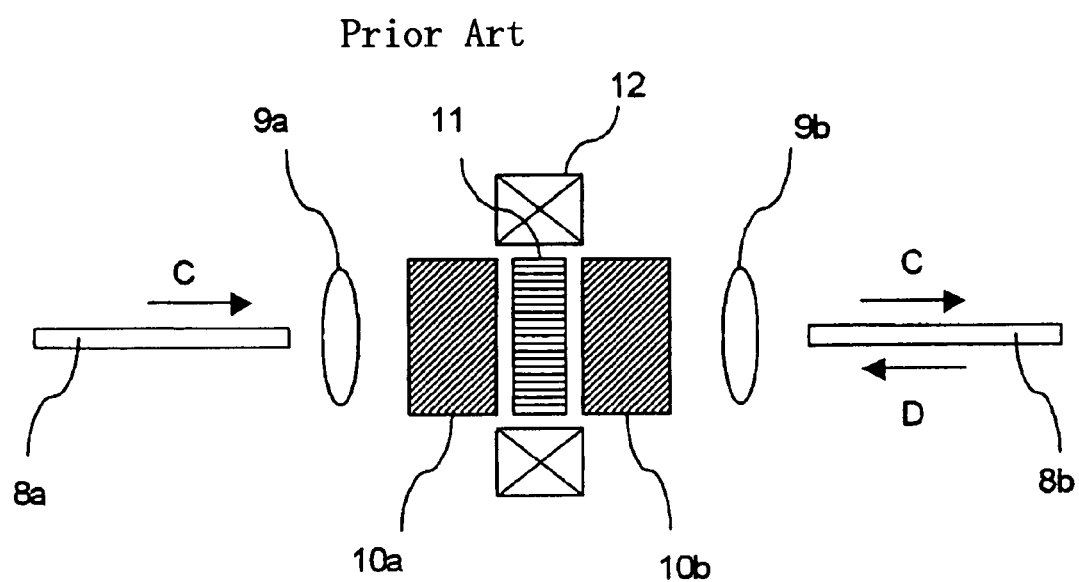
FIG. 6 shows a schematic view of a conventional optical isolator.

A cylindrical magnet 6, having enough strength to attain an angle of rotation of 45° with respect to the Faraday rotator 3 and being able to apply a magnetic field in the same direction as the light beam axis, is positioned over the Faraday rotator. It should be noted that the magnet 6 is not necessarily in the shape of cylinder, and as shown in FIG. 3, the magnet can be shaped in such manner that it surrounds the optical element, and used as a reinforcing member 8. In this case, as shown in FIGS. 4 and 5, the magnet 6 is embedded in the groove 13, resulting in a smaller optical isolator having high-reliability without needing adjustment.

The mechanism of the optical isolator as obtained above will be described below.

With respect to the light incident in the forward direction (the direction of arrow A in the figure) from an optical fiber 4a, the polarization component polarized in one direction is absorbed by the polarizer 1, and the light having the same direction of the polarization as the direction of the transmissive polarization of the polarizer 1 remains. This direction of the polarization is rotated 45° by passing through the Faraday rotator. As a result, the direction of the polarization of the light after passing through the Faraday rotator 3 coincides with the direction of the polarization of the polarizer 2, and the incident light passes through as it is. On the other hand, with respect to the light incident in the reverse direction (the direction of arrow B in the figure) from the optical fiber 4b, a polarization component polarized in one direction is absorbed by the polarizer 2, and the light having the same direction of the polarization as the direction of the transmissive polarization of the polarizer 2 remains. This direction of the polarization is rotated 45° after passing through the Faraday rotator. Since the direction of the rotation due to the Faraday rotator is the same regardless the direction of the proceeding light, the direction of the polarization of the light after passing through the Faraday rotator 3 crosses at 90° with the direction of the transmissive polarization of the polarizer 1. As a result, the light having the opposite direction is absorbed, and does not return to the optical fiber 4a.

TEST EXAMPLE

A pilot optical isolator was made according to the method shown in Examples above. For an outer supporting member 7, a crystalline glass ferrule having a φ1.25 mm was used, and an optical fiber 4 was inserted into the through-hole and bonded with an adhesive. The optical fiber was formed in such manner that the mode field diameter at which the groove was formed became 40 µm. Using a precision slicer, a groove 13 having a width of 410 µm was formed in the center of the ferrule 7, in such manner that the angle between the direction of the groove and the direction perpendicular to the light beam axis became 1.750. For the Faraday rotator 3, Bi-substituted rare-earth garnet having a thickness of 250 µm, whose angle of rotation became 45° at the wavelength of 1.31 µm, was used. On the opposite surfaces of the rotator, a pair of pleochroism polarizers 1 and 2 were bonded via an optical adhesive, in such manner that the angle between the directions of the polarization became 45°, thereby obtaining an optical element. The element was sliced into 0.3 mm×0.3 mm pieces and multiple elements were obtained from the same stock of materials. Each of the resultant optical elements was fit into a square cut-out portion of a magnet 6 (having a shape of the reinforcing member 8 shown in FIG. 3) having the same thickness as the optical element, and the element was bonded to the magnet, thereby obtaining a composite assembly consisting of an optical element and a magnet. The composite assembly was inserted into and bonded to the above-mentioned groove 13 in such manner that the optical element was aligned with the optical fiber, thereby obtaining an optical isolator. The optical properties were measured, and as a result, insertion loss of 0.6 dB and isolation of 28 dB were obtained. The magnet was completely embedded in the groove, and a compact and highly reliable optical isolator was obtained.

As is apparent from the Examples and the Test Example, there was no need to use collimator lenses in the present invention. This is because the end surfaces of the optical fibers were directly brought into contact with the opposite surfaces of the optical isolator element and the thickness of the optical isolator element was sufficiently thin.

Alternatively, as a material for the reinforcing member 8, a crystalline glass, the same material as that of the ferrule, can be used instead of magnet, and the optical element is fit into a square cut-out portion of the reinforcing member and is bonded with an adhesive, as shown in FIG. 3. In this case, the magnet is positioned so that it surrounds the optical element and the reinforcing member, as in the conventional isolators.

Another object of the present invention is to facilitate the assembling of a LD (laser device) using an optical isolator, by providing an optical element-embedded type optical isolator in which the intended direction of the polarization is obtained by simply mounting an optical isolator having a reference base member on a stem surface or a package surface of a LD module, without needing the adjustment of the incident direction of the polarization.

In the present invention, in order to facilitate the alignment of the base member side and the incident plane of polarization, a magnet in the shape of rectangular parallelepiped, an optical element in the shape of rectangular parallelepiped, grooves machined in the shape of rectangle for abutting the sides, are utilized. With this construction, precise angles can be obtained, by simply abutting all the pieces each other.

It should be noted that, by covering the grooved portion of the embedded type optical isolator with some member, structure reinforcement and reliability are also improved.

In the present invention, an optical element consisting of two polarizer glasses and a Faraday rotator is utilized. In this case, the polarizer glass has layers containing oriented fine metal particles (thickness: approximately 50 μm) on the opposite surfaces. In the preferred Example of the present invention, by cutting at the middle portion between the opposite sides or by grinding off one side by lapping and polishing while keeping the other side untreated, a thin optical element is prepared. With the use of a thin element, an optical fiber-embedded type optical isolator exhibiting low transmission loss can be materialized. In other words, in the case of a thick element, transmission loss becomes large due to the diffraction and diffusion of light, but by making the element thinner, the diffraction and diffusion of light are reduced, thereby reducing the loss.

The lapping and polishing of one side of the expensive polarizer glass has a disadvantage in that multiple steps are required. On the other hand, by cutting the portion of the polarizer glass having no function using a grindstone of a relatively fine particle size, these lapping and polishing steps can be omitted, and at the same time, two plates are obtained from one polarizer glass. However, the cut surface will be rough and thus this roughness should be removed. Examples of the methods for mirror-finishing include: 1) a method in which cutting is conducted with a blade having relatively coarse grain size, and then polished with a blade having fine diamond grain size; or a method in which the side wall machining is conducted by using a T-shaped grindstone (grindstone that can be used for machining side walls, such as a cup grindstone, and the like), and 2) a method in which cut-machining is conducted on the article while supplying cerium oxide, colloidal silica and so on to the article.

The embedded type optical isolator of the present invention to be used with an LD module is a polarization-dependent type embedded type optical isolator characterized in that: the optical element to be used is composed of polarizer glasses and a Faraday rotator; the supporting member holding the optical fiber is a ferrule capillary; the permanent magnet to be used for applying a magnetic field to the Faraday rotator is provided with a rectangular groove into which the optical element in the form of rectangular parallelepiped (containing cube) is to be inserted in such manner that the optical element can be positioned in the groove; the bottom of the groove is substantially parallel with the reference side of the magnet; an optical fiber is inserted in the ferrule capillary and bonded; in a rectangular groove of the holder member in which the optical element-positioned magnet is to be embedded at a predetermined position, the reference side of the above-mentioned magnet in which the optical element had been inserted and adhered is positioned; the bottom of the rectangular groove of the holder member is for positioning the reference side of the magnet; and the plate of the holder member parallel with the bottom of the groove is a reference holding plate which is positioned by the holding plate of the LD.

As explained above, the optical element having polarizer glasses used for the embedded type optical isolator has the incident plane of polarization at a predetermined angle with respect to a reference side of the optical element, and in order to transmit the angle of the optical element (including the polarizer glass) to the reference member via the ferrule and the magnet, a groove having a rectangular cross section is formed in the magnet in parallel with the reference side of the magnet in the form of a rectangle in cross section and the optical element is inserted into this groove of the magnet.

With this construction, an embedded type optical isolator having a predetermined incident plane of polarization with respect to the surface of the reference member is obtained.

Figure 7:
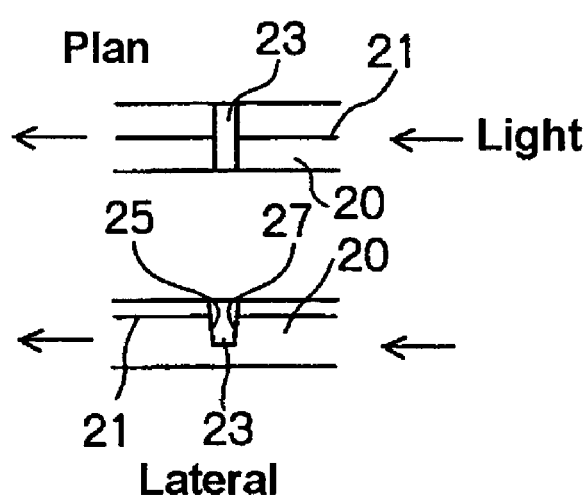
[FIG. 7]
Each of FIGS. 7(a) and 7(b) illustrates the groove for inserting an optical isolator element, formed in a conventional ferrule capillary.
Figure 7:
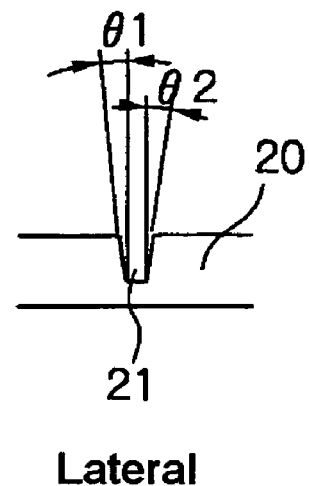
Figure 8:
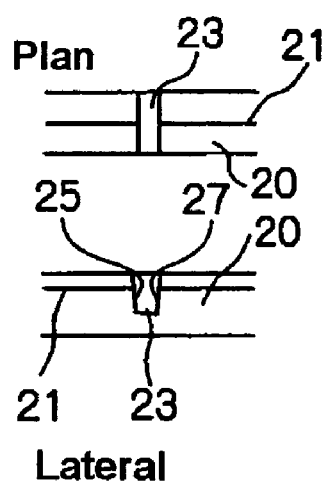
[FIG. 8]
Each of FIGS. 8(a) and 8(b) illustrates the groove for inserting an optical isolator element, formed in a ferrule capillary in the present invention.
Figure 8:
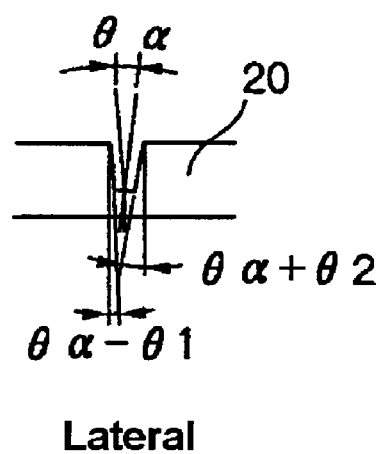

On the other hand, when the groove in the shape of truncated trapezoid is used, the light connection loss can be reduced (the principle thereof is shown in FIG. 8 as a production method 2). In FIG. 8, the numerals mean the same as those used in FIG. 7. In this case, in order to deviate the reflected light, the rectangular groove 23 is formed at a specific angle with respect to the direction of the light beam axis, as shown in the plan view of FIG. 8(*a*). As shown in the lateral view of FIG. 8(*b*), the rectangular groove 23 can be formed with the machining grindstone inclined at the angle of θα, so that the angle θ2 on the incident side with respect to the perpendicular line becomes larger than the angle θ1 on the exit side. With this inclination, a designed deterioration of the connection loss can be obtained. Specifically stated, because of the machining fluctuation, the groove inclination angles θ1 and θ2 becomes almost the same. As the result, the inclination angle θα calculated from the design becomes the same on the incident side and the exit side, and thus θα+θα=2θα. The amount of deviation in light beam axis, which is the sum of the incident side and the exit side of the composite-supporting member interface formed according to the present invention becomes almost the same as that of the designed value, θα+θ1+θα−θ2=2θα. Therefore, the deterioration of the connection loss is small.

It should be noted that, a predetermined inclination of the groove with respect to the light beam axis, which inclination is formed for the reflected light on the end surface, becomes smaller, there arises a problem of increase in the return light. However, with the construction of the present invention in which the groove is formed in such manner that the angle of the incident side (LD side) of the embedded type optical isolator becomes large, the embedded type optical isolator shows excellent reflection reduction and allowable connection (this is because the reflection on the exit side is blecked by the optical isolator).

EXAMPLE 3

Example 3 will be explained with reference to FIG. 9.

In the case of the conventional polarization-dependent type optical isolator which uses polarizer glasses, it is necessary to adjust the incident direction of the polarization when the isolator is inserted in an LD module. On the other hand, the novel embedded type optical isolator of the present invention has such a structure that troublesome adjustment of the direction becomes unnecessary upon assembling the module. In addition, by the use of the novel manufacturing method, adjustment of the direction of the polarization with high precision is made possible, as well as the mass production and low cost can be attained.

Figure 9:
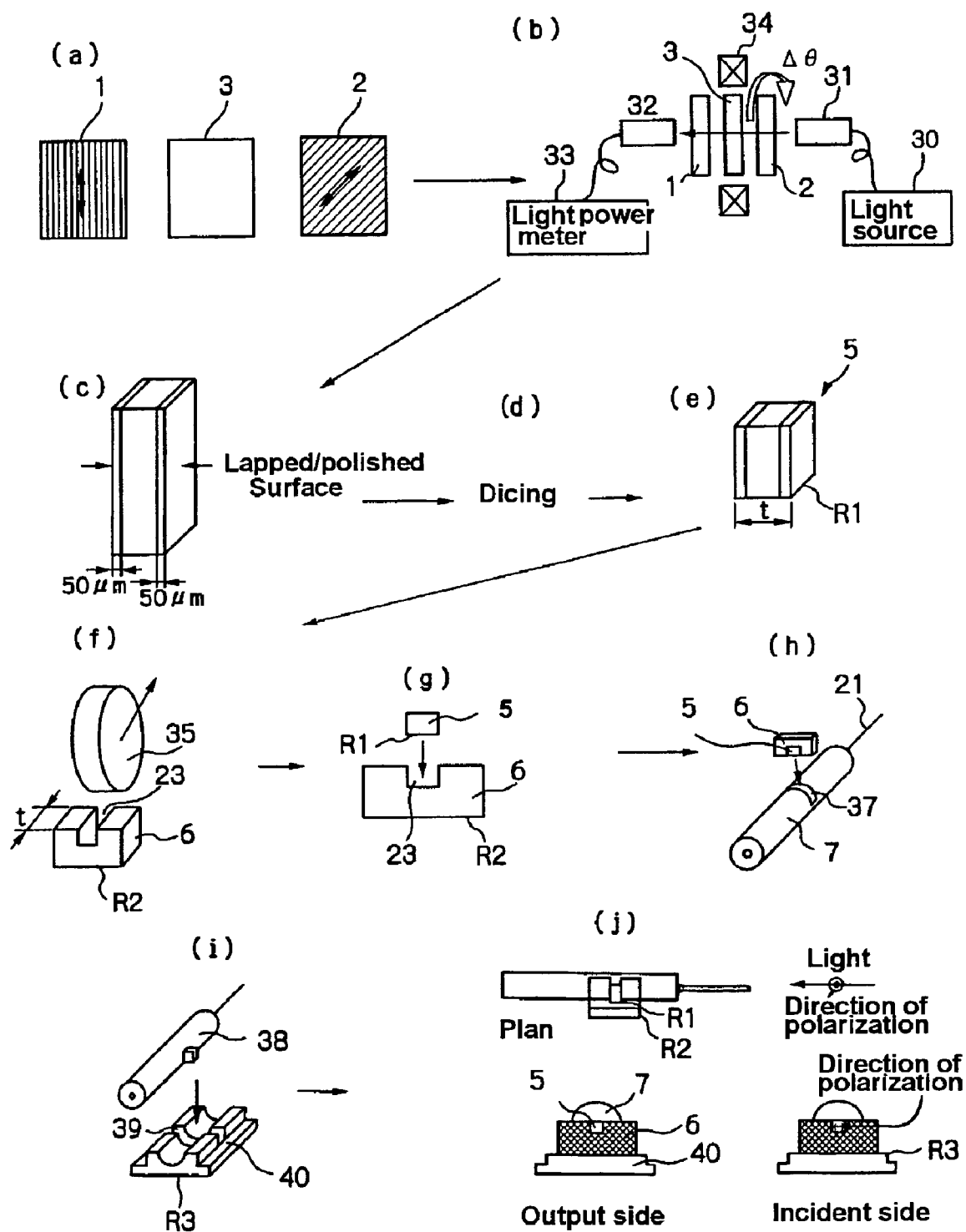
[FIG. 9]

FIG. 9 shows a standard manufacturing method. As shown in FIG. 9(a), the followings are prepared: a polarizer glass 1 having an incident plane of polarization perpendicular to or parallel with (depending on the design) a reference side; a Faraday rotator 3 having an angle of rotation of about 45°; and a polarizer glass 2 having a plane of polarization at an angle of about 45° with respect to the reference side. Each of these element plates has such a size that multiple optical elements can be obtained therefrom.

As shown in FIG. 9(b), these element plates 1, 2 and 3 are placed in a peak wavemeter equipped with a magnet 34, which makes the Faraday rotator magnetically saturated, thereby determining the angle relationships between the plates. Specifically, the light from the LED light source 30 is passed in the reverse direction from the collimator 31 through the element plates 2, 3 and 1; the light is received by the light sensor 32; and the light power is measured using the light power mater 33. While fixing the polarizer glass 1 and the Faraday rotator 3, the polarizer glass 2 is rotated until the angle attaining the maximum isolation is obtained. Therefore, the angles of the element plates are adjusted in advance in such manner that the maximum isolation is obtained at a predetermined wavelength.

Subsequently, the element plates are adhered with an optical adhesive, while maintaining predetermined conditions obtained above.

As shown in FIG. 9(c), both the incident side of the polarizer glass 1 and the exit side of the polarizer glass 2 are ground off so that the grinding reaches just before the layer containing oriented fine metal (Ag) particles (i.e. the thickness: approximately 60 μm). In this manner, a thin element (such as one having the thickness of 0.3 mm–0.5 mm) can be manufactured.

Next, referring to FIG. 9(d), dicing is conducted using a diamond grindstone, thereby cutting out a number of optical elements (for example those having a size of 0.3 mm×0.4 mm).

FIG. 9(e) illustrates a resultant optical element 5. R1 indicates the reference side thereof, and it is in a constant angular relationship with respect to the polarizer glasses 1 and 2.

As shown in FIG. 9(f), a rectangular groove is machined in the permanent magnet 6 for the purpose of inserting and positioning of the optical element 5. The size of the magnet may be, for example, 2.0 mm×1.0 mm×(thickness: 0.3–0.5) mm. The length of the groove 23 is the same as the thickness of the optical element 5, i.e., "t".

By forming the bottom of the groove 23 in such manner that it is in parallel relationship with the reference side R2, the relationship between them remains constant. After the formation of the groove, a predetermined magnetic field is applied to the magnet, to magnetize it.

As shown in FIG. 9(g), the reference side R1 of the optical element 5 is inserted at a predetermined direction in the rectangular groove 23 of the magnet, and bonded. As the result, the reference side R1 of the optical element 5, which side maintains a specific angle with respect to the polarization angles of the polarizer glasses, is maintained in the specific relationship with the reference side R2 of the magnet.

As shown in FIG. 9(h), a TEC optical fiber 21 is bonded in a ferrule capillary 7, the end surface of the ferrule is subjected to PC finishing, and then the fiber is cut.

At a predetermined position of the ferrule in which the TEC optical fiber was bonded (i.e. optical fiber core enlarged portion), a rectangular groove 37 to which the element and the magnet is inserted is formed. Upon forming the groove, a predetermined angle is introduced, in such manner that the reflection at the optical fiber and the element is reduced.

In the groove 37 formed in the TEC optical fiber ferrule capillary 7, the reference side R2 of the rectangular magnet 6 in which the optical element had been inserted is inserted and fixed with an adhesive. The adhesive in which the refractive index has been adjusted and has less transmission loss is selected for bonding, for the purpose of suppressing the reflection and the absorption of the light on the optical path. In this manner, the embedded type optical isolator can be obtained.

As shown in FIG. 9(i), a reference base member 40 is used for the purpose of fixing the embedded type optical isolator to a predetermined position. The base member is provided with a groove 39 on which the rectangular magnet abuts. The bottom surface of the groove 39 is formed in parallel with the bottom surface of the base member 40, i.e. a reference side R3.

Subsequently, as shown in FIG. 9(j), the embedded type optical isolator 38 obtained above is inserted in the base member 40 and bonded. In this manner, the embedded type optical isolator is provided with a predetermined incident direction of polarization with respect to the reference side R3 (i.e. bottom surface of the base member).

EXAMPLE 4

The manufacturing method of the embedded type optical isolator according to Example 4 is explained with reference to FIG. 10. In this Example, mass production method is illustrated.

First, the followings are prepared: a polarizer glass 1 having an incident plane of polarization perpendicular to or parallel with (depending on the design) a reference side; a Faraday rotator 3 having an angle of rotation of about 45°; and a polarizer glass 2 having a plane of polarization at an angle of about 45° with respect to the reference side.

As shown in FIGS. 10(a)–(c), which are the similar steps as those shown in FIGS. 9(a)–(c), with respect to the above-mentioned element plates, the angles are adjusted in advance in such manner that the maximum isolation is obtained at a predetermined wavelength. As shown in FIG. 10(c), multiple strip pieces are obtained from each plate by cutting along the cutting lines 41, 42 and 43 (width of the strip cut out: 0.3 mm, longitudinal size: 10 mm, though it depends on the initial size of the plate).

Next, as shown in FIGS. 10(c)–(d), the plurality of the strip plates are laminated with the following order unit repeated: polarizer glass 0°-Faraday rotator-polarizer glass 45°-Faraday rotator, and bonded together. Upon adhesion, the plates are aligned by abutting them on the reference side of the jig, so that the relative adhesion angles of the plates do not deviate.

Figure 10:
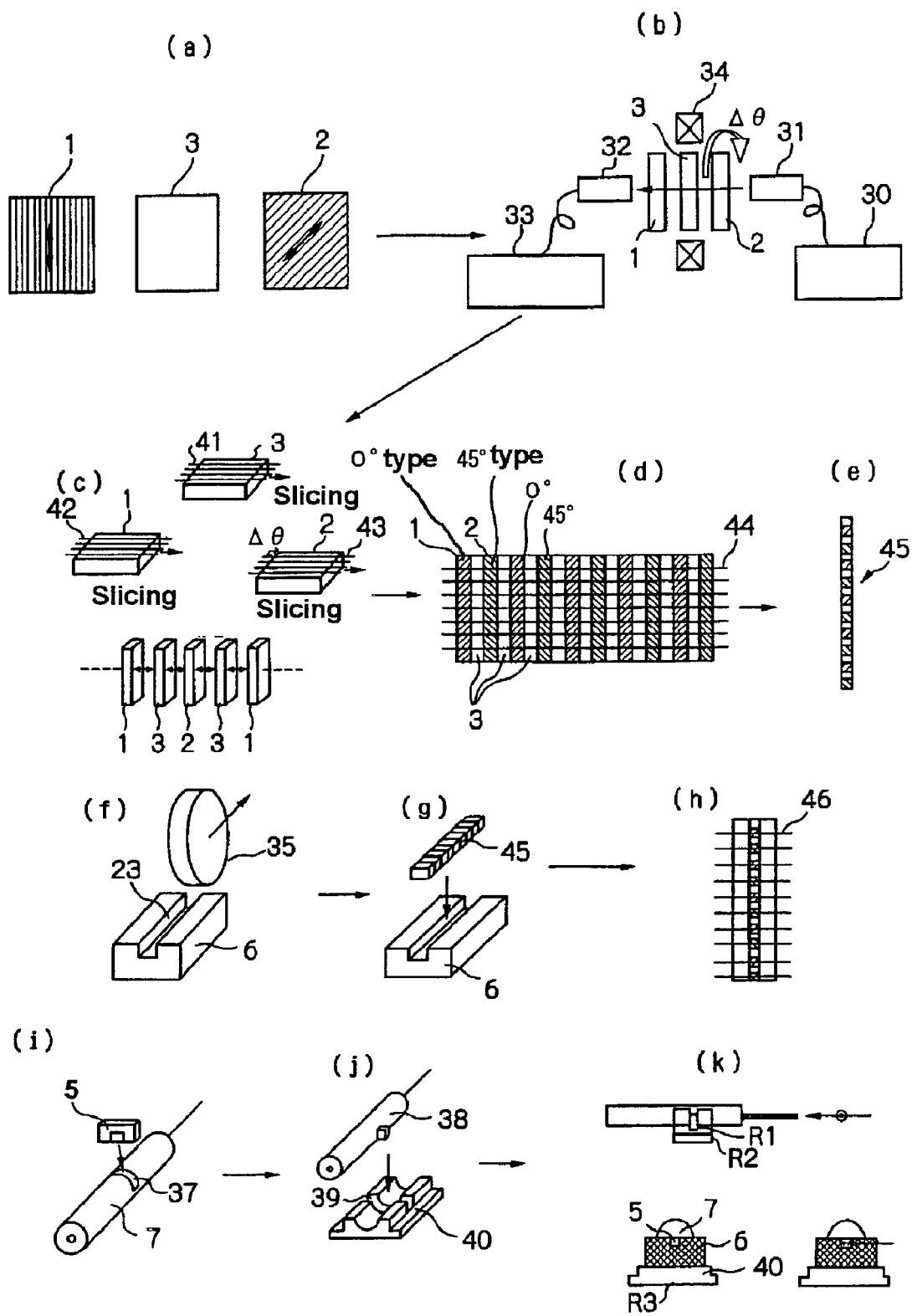
[FIG. 10]

As shown in FIG. 10(d), the array of bonded optical element plates is cut in the direction vertical to the alignment direction of the plates in such manner that strips (width: 0.4 mm) are formed. The resultant strip array of optical element 45 is shown in FIG. 10(*e*).

As shown in FIG. 10(*f*), a groove having a width of 0.45 mm and a depth of 0.35 mm is machined in a magnet 6 in the form of elongated rectangular parallelepiped.

Subsequently, as shown in FIG. 10(*g*), the strip array of optical element 45 is inserted in the magnet groove 23, and fixed with an adhesive.

Referring to FIG. 10(*h*), the center line of the polarizer glass plate of the optical element bonded to the magnet is utilized as a cutting line 46, and the array is cut into individual optical elements. The cutting should be conducted in such manner that the layer containing oriented fine Ag metal particles is not cut (e.g., approximately 0.35 mm is selected as a cutting width).

Then, the steps shown in FIGS. 10(*i*), (*j*) and (*k*), corresponding to the steps shown in FIGS. 9(*h*), (*i*) and (*j*), respectively, are conducted, thereby obtaining a final product. The steps are summarized as follows.

The magnet is magnetized in the direction which attains an appropriate magnetized condition for the construction of the element, a TEC optical fiber is bonded in a ferrule, the end surface of the ferrule is subjected to PC finishing, and the fiber is cut.

At a predetermined position of the TEC optical fiber-bonded ferrule capillary (i.e. optical fiber core enlarged portion), a groove for inserting the element-bonded magnet is formed (upon forming the groove, a predetermined angle is introduced, in such manner that the reflection at the optical fiber and the element is reduced).

In the groove formed in TEC optical fiber ferrule capillary, the optical element-embedded magnet is inserted and fixed with an adhesive (the adhesive in which the refractive index has been adjusted and has less transmission loss is selected, for the purpose of suppressing the reflection and the absorption of the light on the optical path).

A reference base member is used for the purpose of fixing the embedded type optical isolator to a predetermined position (the base member is provided with a groove on which the rectangular magnet abuts. The bottom suface of the groove is formed in parallel with the bottom surface of the base member).

The embedded type optical isolator is inserted in the base member and bonded.

The embedded type optical isolator provided with a predetermined incident direction of polarization with respect to the reference side (i.e. the bottom surface of the base member) is obtained.

EXAMPLE 5

Figure 11:
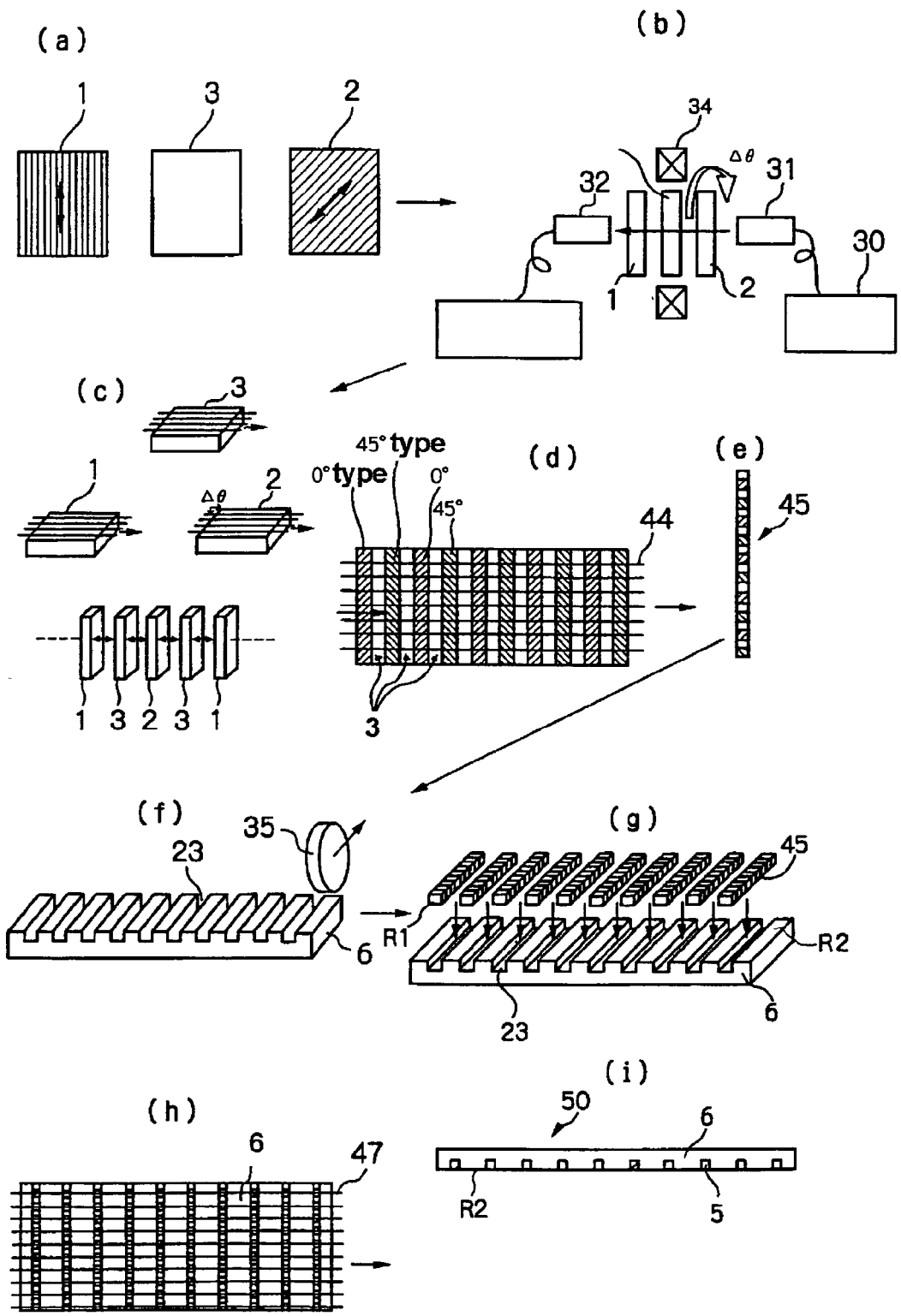
[FIG. 11]
Figure 12:
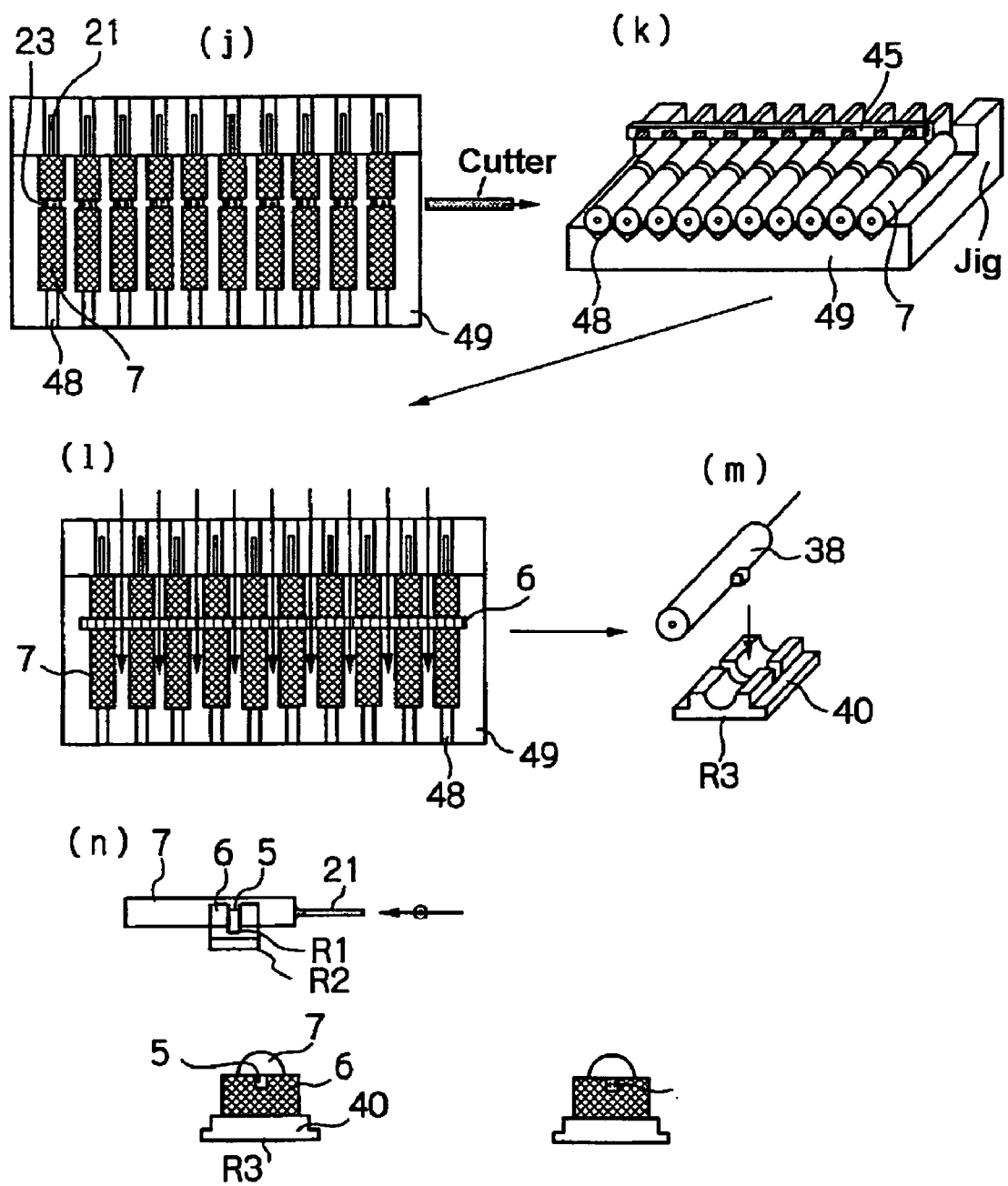
[FIG. 12]

FIGS. 11 and 12 shows another embodiment of the manufacturing method of the optical isolator utilizing embedded type optical isolator array, according to the present invention.

In this example, the steps shown in FIGS. 11(*a*)–(*e*) are conducted first. These steps are substantially the same as the steps shown in FIGS. 10(*a*)–(*e*). However, in this Example, the array of optical element is not cut into individual optical elements, and used as an array per se. The steps up to this point are summarized as follows.

The followings are prepared: a polarizer glass 1 having an incident plane of polarization perpendicular to or parallel with (depending on the design) a reference side; a Faraday rotator 3 having an angle of rotation of about 45°; a polarizer glass 2 having a plane of polarization at an angle of about 45° with respect to the reference side (step (a)).

The angles of the above-mentioned element plates are adjusted in advance in such manner that the maximum isolation is obtained at a predetermined wavelength (step (b)).

Multiple strip pieces are obtained from each plate by cutting (width of the strip cut out: 0.3 mm, longitudinal size: 10 mm, though it depends on the initial size of the plate) (step (c)).

The plurality of the strip plates are laminated with the following order unit repeated: polarizer glass 0°-Faraday rotator-polarizer glass 45°-Faraday rotator, and bonded together. Upon adhesion, the plates are aligned by abutting them on the reference side of the jig, so that the relative adhesion angles of the plates do not deviate (steps (c)–(d)).

The array of bonded optical element plates is cut in the direction vertical to the alignment direction of the plates in such manner that strips (width: 0.4 mm) are formed, thereby obtaining an array of optical element 45 (steps (d)–(e)).

On the other hand, as shown in FIG. 11(*f*), a plurality of grooves each having a width of 0.45 mm and a depth of 0.35 mm are machined in a magnet 6 in the form of elongated rectangular parallelepiped, with a predetermined spacing (2 mm).

As shown in FIG. 11(*g*), a plurality of strip arrays of optical element 45 are inserted in the magnet grooves 23 utilizing the reference side R1 of the array and bonded. The bottom surface of the magnet groove 23 is in parallel relationship with the reference side R2 (in this Example, it is on the side in which the optical element is inserted) of the magnet.

As shown in FIG. 11(*h*), the center line of the polarizer glass plate of the optical element bonded to the magnet is utilized as a cutting line 47 (the cutting should be conducted in such manner that the layer containing oriented Ag particles is not cut. For example, 0.35 mm is selected as a cutting width), and the array is cut into individual optical element arrays 50, with each element integrated with one magnet.

The resultant integrated magnet/optical element array 50 is shown in FIG. 11(*i*).

The magnet 6 with which the array has been integrated is magnetized in the direction which attains an appropriate magnetized condition for the construction of the element.

In the step shown in FIG. 12(*j*), the TEC optical fibers 21 are bonded to their respective ferrule capillaries 7, the end surface of the ferrule is subjected to PC finishing, and the fibers are cut. Each of the resultant ferrule capillary 7 is temporally fixed to the ferrule fixing groove 48 of the temporal fixing jig 49, and at a predetermined position (optical fiber core enlarged portion) of the ferrule capillary 7 in which the TEC optical fiber 21 has been bonded, a rectangular groove 23 for inserting the element-bonded magnet is formed (upon forming the groove, a predetermined angle is introduced, in such manner that the reflection at the optical fiber and the element is reduced).

The grooves are formed at the same time, by placing a plurality of TEC optical fiber-bonded ferrule capillaries with a predetermined spacing at predetermined locations.

In the step shown in FIG. 12(*k*), in the array of grooved TEC optical fiber-bonded ferrules, the integrated magnet/optical element array 50 (FIG. 11(*i*)) is inserted and bonded. The adhesive in which the refractive index has been adjusted and has less transmission loss is selected for bonding, for the purpose of suppressing the reflection and the absorption of the light on the optical path.

In FIG. 12(*l*), the magnet 6 in which the array of optical elements has been embedded with a predetermined spacing is cut between the ferrules, and removed from the jig. As the result, a plurality of the optical isolators with magnet can be obtained. After removing the isolator from the temporal fixing jig, the adhesive and the like are removed by washing (for the above-mentioned temporally fixing of the embedded type optical isolator to the temporal fixing jig, a hot melt type wax is used).

As shown in FIG. 12(*m*), a reference base member 40 similar to the one explained in FIGS. 9(*i*)–(*j*) is used for the purpose of fixing the embedded type optical isolator to a predetermined position (the base member is provided with a groove on which the reference side R2 of the rectangular magnet abuts. The bottom surface of the groove is formed in parallel with the bottom surface of the base member, i.e. the reference side R3).

Subsequently, the embedded type optical isolator is inserted in the base member and bonded.

FIG. 12(*n*) shows the resultant optical fiber-optical isolator unit having the embedded type optical isolator provided with a predetermined incident direction of polarization with respect to the reference side R3 (the bottom surface of the base member).

Figure 13:
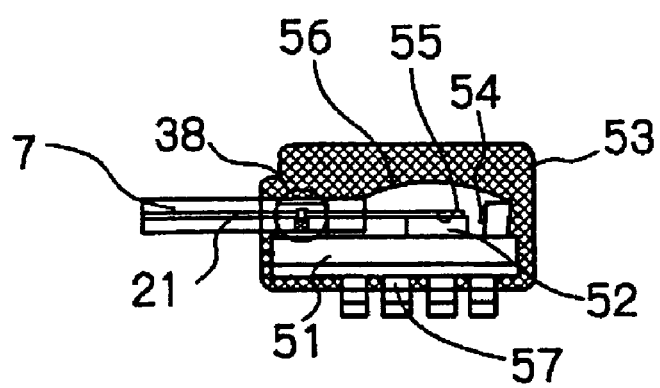
[FIG. 13]

FIG. 13 shows one embodiment in which the isolator of the present invention obtained one of the Examples above is installed in an LD module.

The LD module comprises: a ceramic substrate plate 51; an LD chip supported by a Si-V grooved stem 52 and a monitor PD 54, which are positioned on the reference side of the substrate plate; a lead frame 57 attached on the back side of the substrate plate 51; and a transfer mold 53 made of epoxy resin that contains all of the above, all of which are fixed by a transparent mold resin 56. With respect to the embedded type optical isolator of the present invention, as shown in the drawing, the reference side R3 of the holder member is mounted on the reference side of the substrate plate 51 and fixed. With this construction, the reference side (surface) R1 of the optical element, the reference side (surface) R2 of the magnet, and the reference side R3 of the holder member are in the parallel relationships, and the planes of polarization of the polarizer glasses 1 and 2 are maintained in the constant relationships with the LD module.

EXAMPLE 6

Another manufacturing method of the optical isolator utilizing the embedded type optical fiber array is explained with reference to FIGS. 14–15. In this Example, an inexpensive glass substrate plate is used as a holder substrate plate, and to the plate the ferrule capillary is fixed permanently. This glass substrate plate is fixed to the optical element (consisting of polarizing plates and a Faraday rotator bonded together) in such manner that the reference side of the plate is maintained in a predetermined relationship with the reference side of the optical element (in the case of the integrated magnet/optical element, the reference side of the magnet). With this construction, the optical isolator can be easily assembled.

Figure 14:
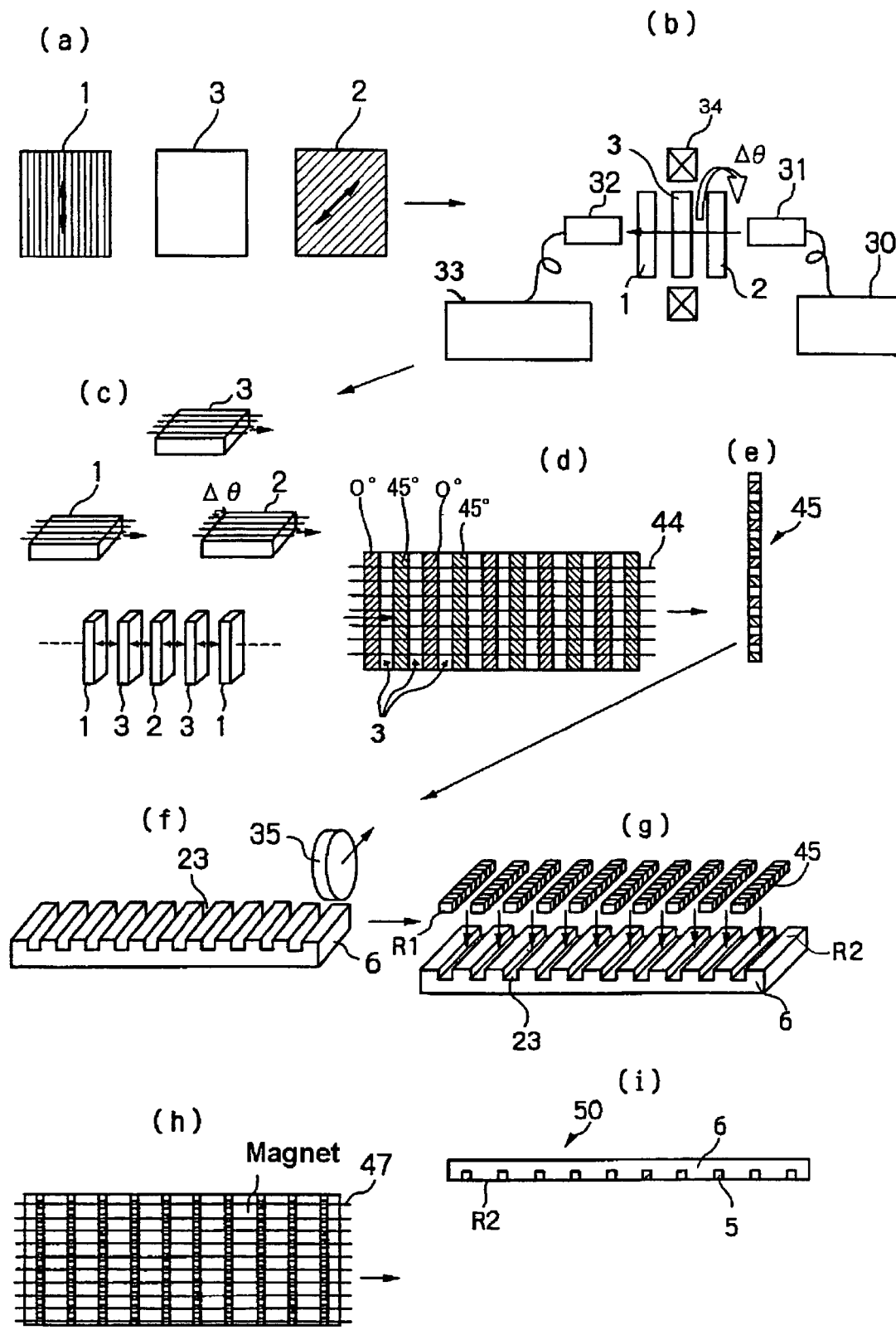
[FIG. 14]

In this Example, as in the steps shown in FIGS. 14(*a*)–(*i*), an array prepared by embedding a plurality of optical elements in a magnet is obtained. These steps are substantially the same as the steps (a)–(i) shown in FIG. 11, and thus the reference can be made to Example 3 for details. The steps up to this point are summarized as follows.

The followings are prepared: a polarizer glass 1 having an incident plane of polarization perpendicular to or parallel with (depending on the design) a reference side; a Faraday rotator 3 having an angle of rotation of about 45°; a polarizer glass 2 having a plane of polarization at an angle of about 45° with respect to the reference side (step (a)).

The angles of the above-mentioned element plates are adjusted in advance in such manner that the maximum isolation is obtained at a predetermined wavelength (step (b)).

Multiple strip pieces are obtained from each plate by cutting (width of the strip cut out: 0.3 mm, longitudinal size: 10 mm, though it depends on the initial size of the plate) (step (c)).

The plurality of the strip plates are laminated with the following order unit repeated: polarizer glass 0°-Faraday rotator-polarizer glass 45°-Faraday rotator, and bonded together (steps (c)–(d)). Upon adhesion, the plates are aligned by abutting them on the reference side of the jig, so that the relative adhesion angles of the plates do not deviate.

The array of bonded optical element plates is cut in the direction vertical to the alignment direction of the plates in such manner that strips (width: 0.4 mm) are formed, thereby obtaining an array of optical element 45 (steps (d)–(e)).

A plurality of grooves each having a width of 0.45 mm and a depth of 0.35 mm are machined in a magnet 6 in the form of elongated rectangular parallelepiped, with a predetermined spacing (3 mm) (step (f)).

A plurality of strip arrays of optical element 45 are inserted in the magnet groove 23 utilizing the reference side and bonded (step (g)).

The center line of the polarizer glass plate of the optical element bonded to the magnet is utilized as a cutting line (the cutting should be conducted in such manner that the layer containing oriented Ag particles is not cut. This time, 0.35 mm is selected as a cutting width), and the array is cut (step (h)).

The magnet 6 is magnetized in the direction which attains an appropriate magnetized condition for the construction of the element (step (i)).

Figure 15:
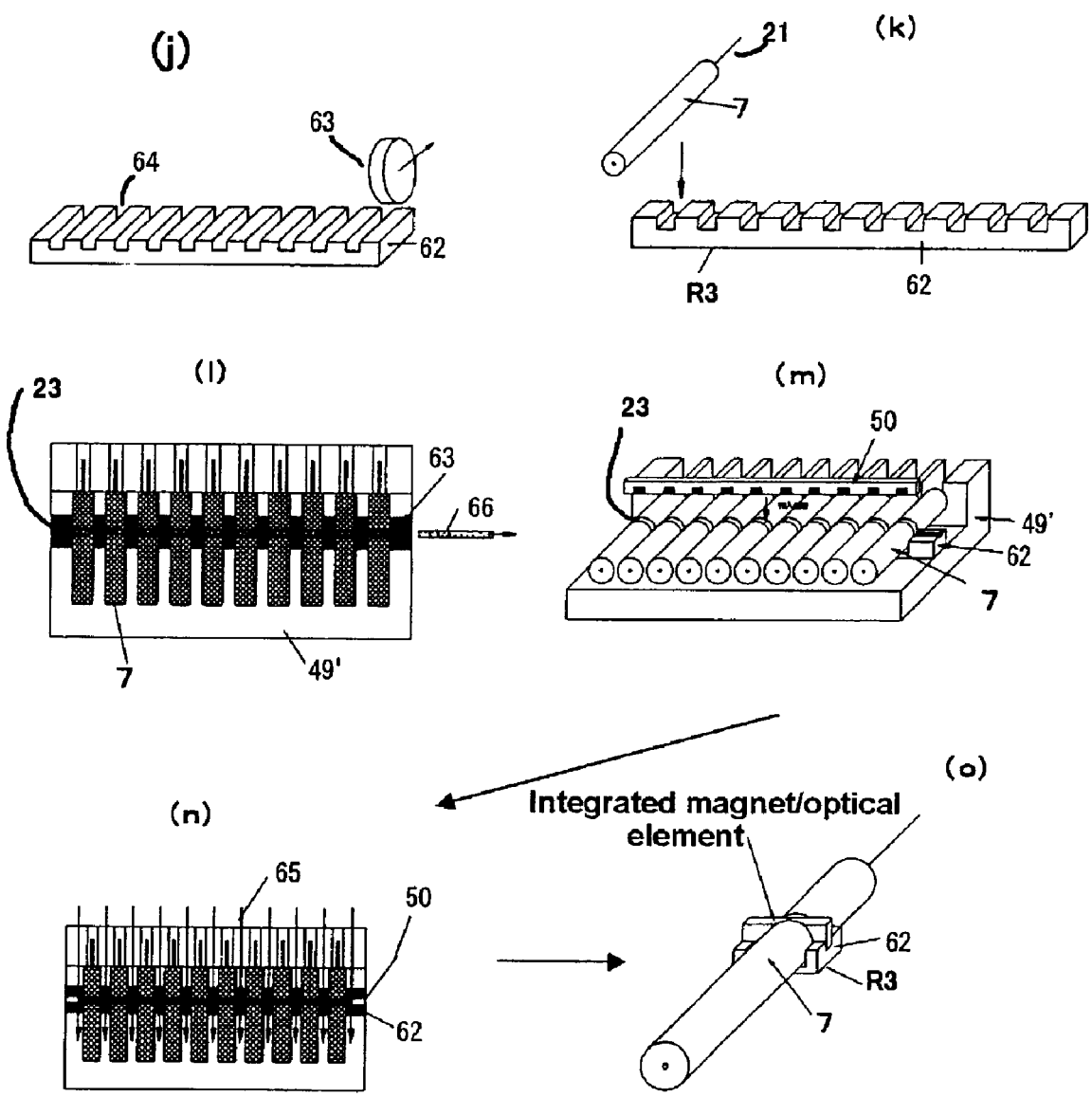
[FIG. 15]

Separately from the integrated magnet/optical element array 50, in the steps shown in FIGS. 15(*j*)–(*l*), an array in which multiple optical fiber ferrules are fixed on a glass substrate plate is prepared. In other words, first in the step (j) shown in FIG. 15, rectangular grooves 64 (or V-shaped grooves) are formed on a glass substrate plate 62 (it is possible to use other stable inorganic material instead), using a grindstone 63, for the purpose of aligning the ferrules at predetermined positions. Subsequently, in the step (k) shown in FIG. 15, each of the end surface of the ferrule capillary 7 in which the TEC optical fiber 21 has been embedded and bonded is subjected to PC finishing, and the fibers are cut. Each of these ferrules is placed at a predetermined position of the groove 64, and fixed with an adhesive, thereby obtaining an optical fiber array.

Next, as shown in FIG. 15(*l*), the reference side R3 of the glass substrate plate 62 to which the optical fiber array has been bonded is placed on the upper surface of the jig 49', and at a predetermined position (optical fiber core enlarged portion), grooves 23 are formed in which the integrated magnet/optical element array 50 is inserted. Upon forming the groove, a predetermined angle is introduced, in such manner that the reflection at the optical fiber and the element is reduced. The groove is formed in such manner that all ferrule capillaries 7 of the optical fiber array and the glass substrate plate 62 is cut. The bottom surface of the groove 23 is formed in parallel with the reference side R3 of the glass substrate plate.

In the step (m) shown in FIG. 15, the reference side R1 of the optical element, or alternatively, in the case that the reference side R2 is formed on the magnet 6 in a predetermined relationship with respect to the reference side R1 of the optical element, R2 is inserted the bottom surface of the groove 23, so that the reference side abuts on the groove and the optical elements are aligned with the respective optical fiber, and then bonded. The adhesive in which the refractive index has been adjusted and has less transmission loss is selected for bonding, for the purpose of suppressing the reflection and the absorption of the light on the optical path. With this construction, the integrated magnet/optical element array 50 is fixed to the precise position and angle relationship with respect to the reference side R3 of the glass substrate plate 62.

In the step shown in FIG. 15(n), at the cutting line 65 between the ferrule capillaries 7, the magnet 6 and the glass substrate plate 62 are cut using a cutting grindstone, thereby cutting the embedded type optical isolator array arranged with a predetermined spacing into individual optical isolators. In this manner, the embedded type optical isolator provided with a predetermined incident direction of polarization with respect to the reference side of the glass substrate can be obtained. In this embodiment, instead of the holder member used in the above-mentioned Example, a substrate plate, such as an inexpensive glass substrate plate can be used. As a result, the present optical element array method has advantages in that inexpensive optical isolators can be easily produced in a mass scale.

EXAMPLE 7

In this Example, the optical isolator similar to that obtained using embedded type optical isolator array in Example 4 is illustrated, though the array is not used in this method.

First, substantially the same steps (a)–(e) in Example 1 (FIG. 9) are repeated, thereby obtaining an optical isolator element. The steps up to this point are summarized as follows.

The followings are prepared: a polarizer glass 1 having an incident plane of polarization perpendicular to or parallel with (depending on the design) a reference side; a Faraday rotator 3 having an angle of rotation of about 45°; a polarizer glass 2 having a plane of polarization at an angle of about 45° with respect to the reference side (same as the step (a) in FIG. 9).

The angles of the above-mentioned element plates are adjusted in advance in such manner that the maximum isolation is obtained at a predetermined wavelength (same as the step (b) in FIG. 9).

The plates are bonded with a predetermined construction (same as the step (c) in FIG. 9).

Both the incident side of the polarizer glass 1 and the exit side of the polarizer glass 2 are ground off so that the grinding reaches just before the layer containing oriented Ag particles (i.e. the thickness: approximately 60 μm).

Dicing is conducted, thereby cutting out a number of optical elements 5 having a size of 0.3×0.4 mm (steps (d)–(e)).

Figure 16:
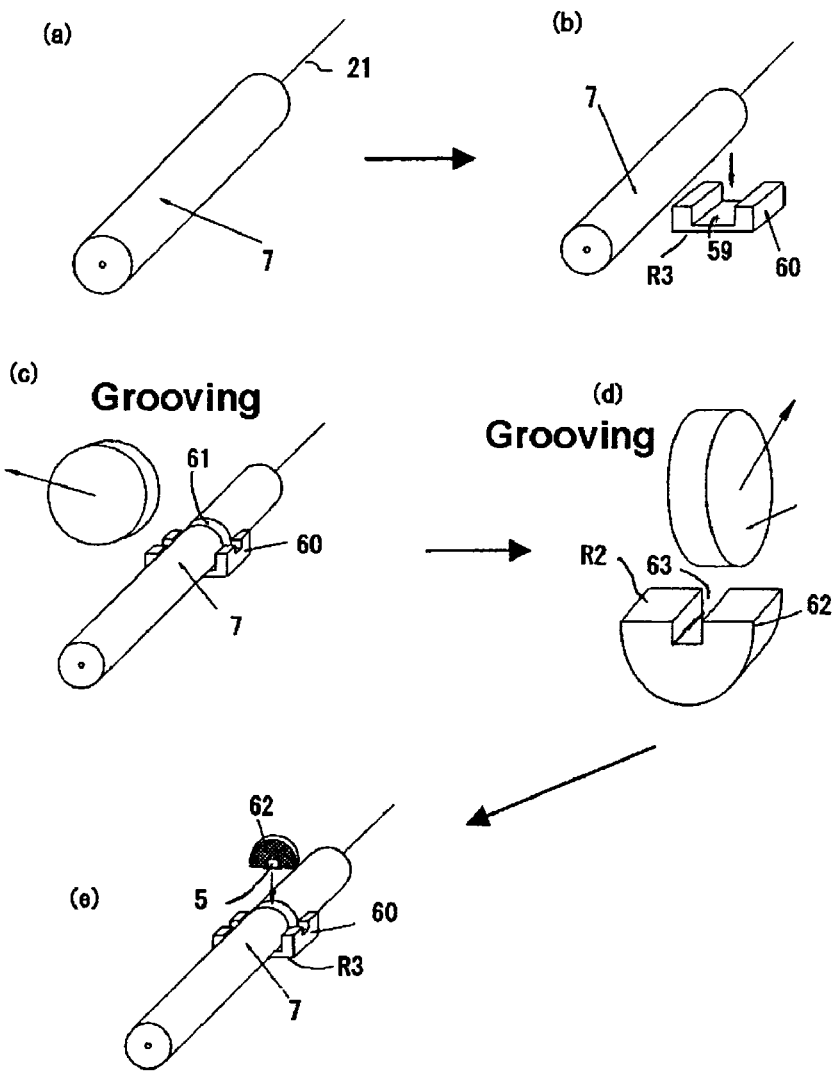
[FIG. 16]

Separately from the optical element, as in the step (a) shown in FIG. 16, a TEC optical fiber 21 is bonded in the ferrule 7 (φ1.25 mm), and the end surface of the ferrule is subjected to PC finishing and the fiber is cut.

Subsequently, as in the step (b) shown in FIG. 16, the TEC optical fiber-bonded ferrule 7 is bonded to a V-shape or rectangular groove 59 of a glass plate 60 (in this case, t=1.0), which groove has been formed using a reference side R3 as a criterion (and in which the cylindrical ferrule capillary stably sits).

Next, in the step (c) shown in FIG. 16, using the reference plate bottom surface R3 as a criterion, a groove 61 is formed at a predetermined position (optical fiber core enlarged portion) of the TEC optical fiber-bonded ferrule, in which the element and the magnet are inserted. Upon forming the groove, a predetermined angle is introduced, in such manner that the reflection at the optical fiber and the element is introduced.

Separately from the above, in the step (d) shown in FIG. 16, a cylindrical magnet 62 (φ1.25) is machined so that the surface area cut out becomes almost the same as that of the groove formed in the ferrule (the surface area cut out becomes a reference side R2), then rectangular groove 63 is machined for inserting and positioning the element, and the magnet 62 is magnetized.

At the step (e) in FIG. 16, the reference side R1 of the optical element 5 is inserted in the bottom of the groove 63 of the magnet 62 in a predetermined direction. In the grooved TEC optical fiber-bonded ferrule 7, the optical element 5 and the magnet 62 are inserted and bonded. The reference side R2 of the magnet is brought into the specific relationship with R3. The adhesive in which the refractive index has been adjusted and has less transmission loss is selected for bonding, for the purpose of suppressing the reflection and the absorption of the light on the optical path.

With this construction, the positions of all the members can be precisely controlled via the reference sides R1 and R2, and therefore, the embedded type optical isolator provided with a predetermined incident direction of polarization with respect to the reference side R3 is obtained.

Another embodiment of the present invention in which the optical element functions as an optical isolator will be explained below.

EXAMPLE 8

Figure 17:
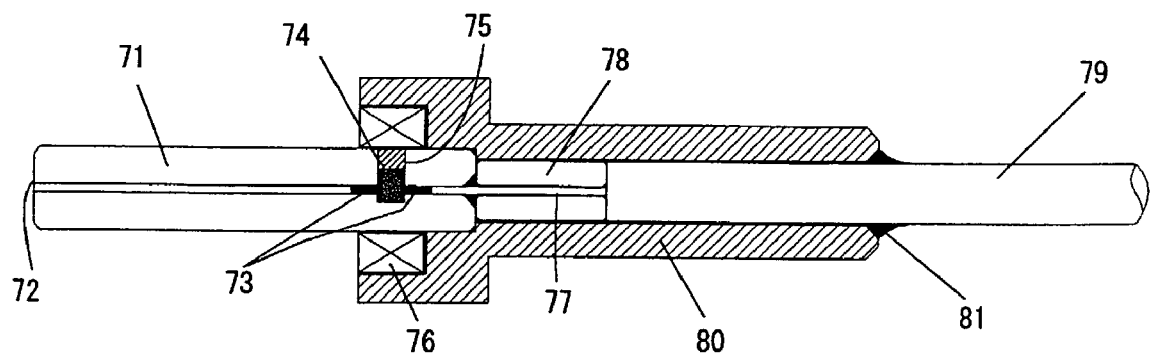
[FIG. 17]

FIG. 17 illustrates an optical isolator with a built-in fiber connector, according to another embodiment of the present invention.

A transverse groove 75 is formed in a ferrule capillary 71 in which an optical fiber 72 has been embedded, and in the groove, an optical isolator element 74 (such as one consisting of a pair of polarizers or birefringent plates and a Faraday rotator sandwiched therebetween) is inserted and bonded. The end surface of the capillary 71 is ground-finished for the purpose of optical coupling. A metal housing 80 has: a hole in which the capillary 71 is fit and hold; a larger hole in which a magnet 76 for applying a magnetic field to the Faraday rotator is hold; and a smaller hole for holding an optical cable composed of an optical fiber 77, a sleeve 78 and an optical fiber cover 79. The optical cable is bonded to the housing 80 with an adhesive 81, and the end of the optical fiber 77 is brought into contact with the end surface of the optical fiber 72 in the ferrule capillary 71, thereby attaining optical coupling.

The optical fiber 72 is preheated in the manner that it has a core diameter enlarged area 73 at the portion abutting groove 75. By forming the groove 75 at this portion and inserting the optical isolator element 74, lenses for optical coupling become unnecessary.

The feature of the present embodiment is that the structure is reinforced by bonding the optical isolator element 74-embedded area of the capillary 71 to the hole of the metal housing or to the magnet 76 held in the hole. As a result, in this embodiment in which the capillary 71 functions as a connector, the concentration of a stress on the groove 75 of the capillary 71 can be avoided, and strength enough to withstand the repeated mounting and dismounting can be obtained.

EXAMPLE 9

Figure 18:
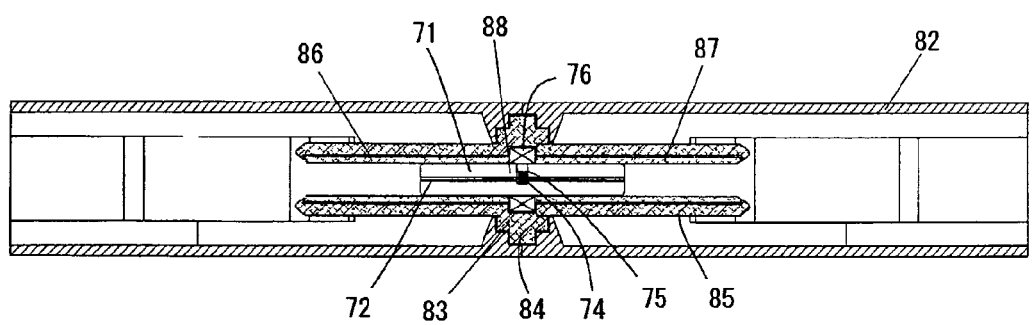
[FIG. 18]

FIG. 18 illustrates an optical isolator with a built-in ferrule connector, according to one embodiment of the present invention. In this Example, it is provided an optical isolator with a built-in ferrule connector, comprising an embedded type optical isolator and split sleeves in a housing having a shape that accommodates a specific connector. In addition to the advantage obtained in Example 1, the present Example has advantages in that the inexpensive inline optical isolator with no lenses can be easily assembled, with the use of a commercial connector.

Referring to FIG. 18, a transverse groove 75 is formed in a ferrule capillary 71 in which an optical fiber 72 has been embedded, and in the groove, an optical isolator element 74 (such as one consisting of a pair of polarizers or birefringent plates and a Faraday rotator sandwiched therebetween) is inserted and bonded. The opposite end surfaces of the capillary 71 are ground-finished for the purpose of optical coupling.

Each of the metal housings 83 and 85 has a hole in which the capillary 71 is fit and hold; and the metal housing 83 has a larger hole in which a magnet 76 for applying a magnetic field to the Faraday rotator is hold. Between the metal housing 85 and the metal housing 83, a space for accommodating the magnet 76 is formed, and the magnet 76 is kept to a specific position by tightly fitting the housings together. The peripheral projection 84 of the metal housing has a circumferential groove which is complementary with the inner peripheral projection of the plastic housing 82. The metal housings 83 and 85 have elastic split sleeves 86 and 87, respectively, on the inner surfaces thereof. With these sleeves, the opposite ends of the optical fiber ferrule 71 in which the optical isolator 88 is embedded are easily brought into contact with other optical fiber ferrules.

The optical fiber 72 is preheated in the manner that it has an enlarged core diameter at the portion abutting the groove 75. By forming the groove 75 at this portion and inserting the optical isolator element 74, lenses for optical coupling become unnecessary.

The feature of the present embodiment is that, in addition to those mentioned above, the structure is reinforced by bonding the optical isolator element 74-embedded area of the capillary 71 to the hole of the metal housing 83 or to the magnet 76 held in the hole. As a result, in this embodiment in which the capillary 71 functions as a connector, the concentration of a stress on the groove 75 of the capillary 71 can be avoided, and strength enough to withstand the repeated mounting and dismounting can be obtained.

EXAMPLE 10

Figure 19:
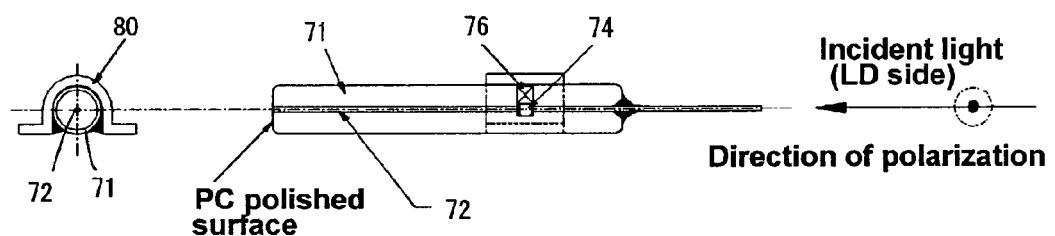
[FIG. 19]
Figure 20:
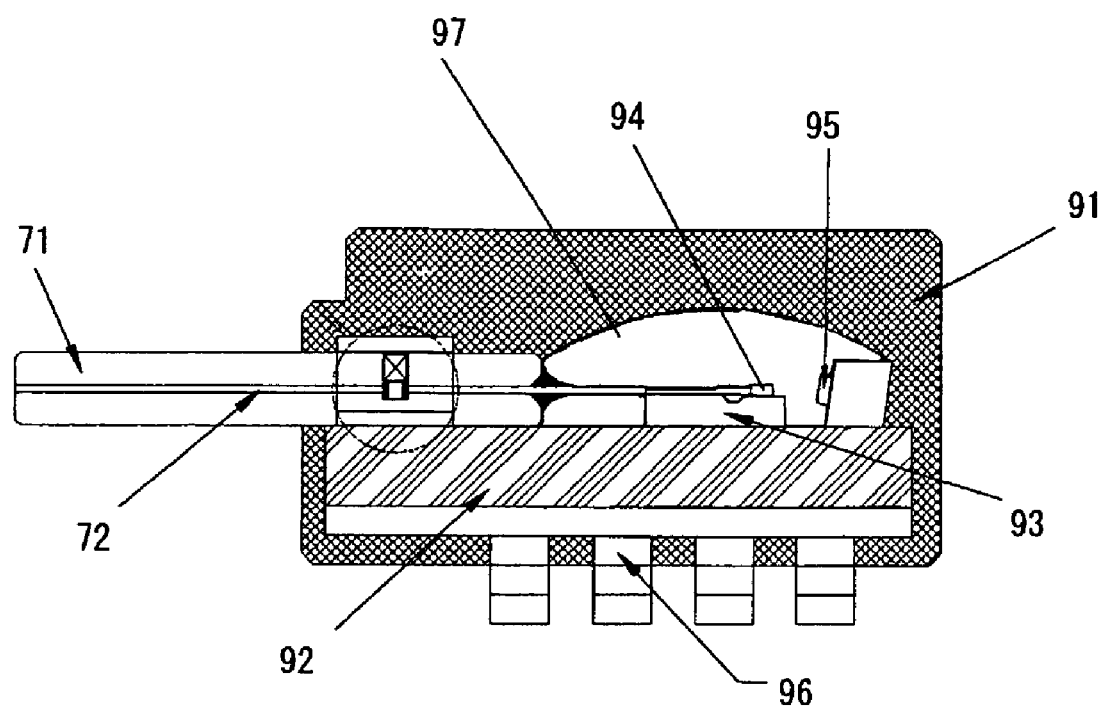
[FIG. 20]

FIGS. 19 and 20 show another embodiment in which the isolator of the present invention is assembled in a semiconductor laser module. In a plane packaging type LD module, by embedding an optical isolator in a ferrule connector with one side of the fiber cut, a compact LD module with a high performance can be materialized.

FIG. 19 illustrates the optical fiber ferrule and the structure for reinforcing the ferrule to be used in the present Example. Referring to FIG. 19, a transverse groove 75 is formed in a ferrule capillary 71 in which an optical fiber 72 has been embedded, and in the groove, an optical isolator element 74 (such as one consisting of a pair of polarizers or birefringent plates and a Faraday rotator sandwiched therebetween) is inserted and bonded. In addition, in the groove 75 of the ferrule capillary 71, a magnet 76 is inserted, and the left end surface of the capillary 71 is ground-finished for the purpose of optical coupling. A metal housing 80 having a shape of arc is used with the ferrule capillary 71 in such manner that the housing covers the optical isolator element 74 and the magnet 76 at the groove 75, and bonded with an adhesive. With this construction, the groove portion of the capillary is reinforced. The optical fiber 72 is preheated in the manner that it has an enlarged core diameter at the portion abutting the groove 75. By forming the groove 75 at this portion and inserting the optical isolator element 74, lenses for optical coupling become unnecessary.

FIG. 20 shows one embodiment in which the optical isolator-embedded ferrule capillary 71 constructed as shown in FIG. 19 is assembled into a LD module. The LD module comprises: a ceramic substrate plate 92; an LD chip 94 supported by a Si-V grooved stem 93, and a monitor PD 95, which are positioned on the substrate plate 92; a lead frame 96 attached on the back side of the substrate plate 92; and a transfer mold 91 made of epoxy resin that contains all of the above, all of which are fixed by a transparent mold resin 97.

The feature of the present embodiment is that, in addition to those mentioned above, the structure is reinforced by bonding the optical isolator element 74-embedded area of the capillary 71 to the metal housing 80. As a result, in this embodiment in which the capillary 71 functions as a connector, the concentration of a stress on the groove 75 of the capillary 71 can be avoided, and strength enough to withstand the repeated mounting and dismounting can be obtained.

According to the construction of the present invention, not only collimator lenses are dispensed with, but also a precise positional adjustment of the optical fiber, the polarizers and the Faraday rotator is not necessary, so that the positional alignment of the assembled members is remarkably simplified.

In addition, by adjusting and bonding large size polarizers and a large size Faraday rotator, a number of elements can be cut out from the adjusted and bonded assembly and thus a mass production is made possible. Moreover, the area through which the light beam passes is very small, the size of the optical element composed of the polarizers and the Faraday rotator may also be made small and by embedding them in the groove together with the reinforcing member surrounding the optical element, a very compact optical isolator of a high reliability is realized.

According to another embodiment of the present invention, when the embedded type optical isolator of the present invention is used, by simply mounting the reference side of the embedded type optical isolator on the reference side of the LD module, a troublesome adjustment of the incident direction of the polarization becomes unnecessary.

In addition, according to the manufacturing method of an optical fiber-embedded type optical isolator of the present invention, even though expensive polarizer glasses are used, inexpensive isolators can be obtained by effectively machining the polarizer glasses.

By grinding off one side of the polarizer glass up to the plane close to the layer containing oriented fine metal particles (layer containing oriented Ag particles) having a polarization function (about 50 μm), a thin optical element that can be embedded between optical fibers can be obtained.

It should be noted that the polarizer glass has two layers containing fine metal particles on the opposite sides thereof. In order to effectively use both layers, the middle portion between the layers of the polarizer glass (in the thickness direction) is cut with a slicer, a wire saw, a band saw or the like. As a result, troublesome grinding steps can be reduced, and the number of multiple elements obtained from one polarizer glass can be increased, leading to inexpensive embedded type optical isolators.

According to another embodiment of the present invention, when the ferrule capillary in which the optical fiber and the optical element are embedded is used as an optical fiber connector, practical strength and durability, as well as the advantages explained in the Examples above, can be obtained.

What is claimed is:

1. An optical isolator comprising:
    an outer support having an optical fiber and a groove formed transversely across the optical fiber and splitting the optical fiber into two sections in the outer support;
    a composite assembly which comprises an optical element composed of a Faraday rotator and a pair of polarizers;
    a structure reinforcing member having a thickness substantially the same as the thickness of the composite assembly and integrally retaining the composite assembly therein to form a pre-assembly; and
    the pre-assembly being inserted and bonded in the groove as a unit.

2. An optical isolator according to claim 1, wherein the reinforcing member is made of the same material as the outer support.

3. An optical isolator according to claim 1, wherein the reinforcing member is a magnet for applying a magnetic field to the Faraday rotator.

4. A polarization-dependent embedded type optical isolator, comprising:
    a ferrule capillary having optical fibers in alignment and having an embedding groove cut transversely across the optical fibers;
    an optical element composed of polarizer glass plates and a Faraday rotator, the optical element being formed into a rectangular parallelepiped having a first reference side;
    a permanent magnet for applying a magnetic field to the Faraday rotator and having a thickness substantially the same as the optical element, the permanent magnet being provided with a rectangular groove into which the optical element is to be inserted, said permanent magnet being further provided with a second reference side substantially parallel with the bottom of the rectangular groove;
    the optical element being inserted and fixed in the rectangular groove of the permanent magnet with said first reference side of the optical element being at a predetermined direction with respect to the bottom of the rectangular groove,
    the permanent magnet having the optical element inserted in the rectangular groove being inserted and fixed in the embedding groove of the ferrule capillary; and
    a holder member having a rectangular holding groove and having a third reference side substantially parallel with the bottom of the holding groove;
    the permanent magnet being inserted in the rectangular holding groove of the holder member with the second reference side of the permanent magnet being at a predetermined direction with respect to the bottom of the holding groove.

5. A polarization-dependent embedded type optical isolator, comprising:
    a base plate having a surface as a first reference side,
    a ferrule capillary having optical fibers embedded and fixed in alignment in the capillary, the ferrule capillary being located and bonded in position on the base plate,
    a rectangular groove cutting through the base plate and the ferrule capillary at a predetermined position and at a predetermined angle, a surface of the rectangular groove being in relation with respect to the first reference surface,
    an optical element composed of polarizer glass plated and a Faraday rotator, said optical element being in the form of a rectangular parallelepiped, one side of the rectangular parallelepiped forms a second reference side,
    a permanent magnet for applying a magnetic field to the Faraday rotator disposed around the optical element, said permanent magnet having a thickness substantially same as the optical element,
    the optical element and the permanent magnet being inserted in the rectangular groove of the ferrule capillary with the second reference side abutting the bottom of the rectangular groove to position the optical element,
    whereby the incident direction or plane of polarization of the optical element is in a predetermined relation with the bottom surface of the base plate.

6. A polarization-dependent embedded type optical isolator according to claim 5, wherein the magnet has a groove, the optical element is fit in the groove of the magnet, an assembly consisting of the optical element and the magnet is inserted in the rectangular groove of the ferrule capillary, and the second reference side of the optical element is abutted against the bottom of the groove of the ferrule capillary to obtain a precise positioning so that the direction of the polarization on the incident side of the optical element is in a predetermined relation with the bottom surface of the base plate.

7. A polarization-dependent embedded type optical isolator according to claim 4, wherein the light incident side wall of the groove formed in the ferrule capillary for embedding the permanent magnet is inclined with respect to the direction of the depth of the groove.

8. An optical isolator, comprising:
    an optical fiber;
    an optical element which comprises polarizer glass plates and a Faraday rotator and is in the form of rectangular parallelepiped, which of one side is used as a reference side;
    a magnet for applying a magnetic field to the Faraday rotator and having a rectangular groove formed therein for holding the optical element, the magnet having a thickness substantially the same as the thickness of the optical element, and the rectangular groove having one side substantially parallel to the reference side of the optical element;
    a ferrule capillary having a holding groove formed therein for holding the optical element in alignment with the optical fiber, the holding groove having a width slightly larger than the thickness of the magnet and the optical element; and a base plate having a capillary holding groove formed therein, the capillary holding groove having a bottom surface substantially parallel to a bottom surface of the base plate groove, the magnet holding the optical element inserted and bonded in the rectangular groove of the magnet being inserted in the holding groove of the capillary ferrule, and the capillary ferrule being inserted and bonded in the capillary holding groove of the base plate.

9. An optical device comprising:

a ferrule capillary having a through-hole in which an optical fiber is inserted and bonded, at least one end surface of the ferrule capillary being polished so that the end surface functions as a connector to connect the outer support to an optical fiber ferrule, a groove formed in the ferrule capillary transversely across the optical fiber, and an optical element having various functions and a magnet surrounding the optical element being embedded in the groove, wherein peripheral portion of the groove having the optical element and the magnet embedded therein is covered and supported by an outer supporting member for the ferrule capillary.

10. An optical device comprising:

a ferrule capillary having a through-hole in which an optical fiber is inserted and bonded, at least one end surface of the ferrule capillary being polished so that the end surface functions as a connector to connect the ferrule capillary to another optical fiber ferrule, a groove formed in the ferrule capillary transversely across the optical fiber, and an optical element having various functions embedded in the groove, a magnet having an inner wall surrounding the optical member, an optical cable having another optical fiber, an outer supporting member having a through-bore for supporting one end portion of the optical fiber ferrule and one end portion of the optical cable fitted in the through-bore, wherein the one end portion of the optical fiber ferrule is covered and supported at periphery of the groove having the optical element embedded therein by the inner wall of the magnet which in turn is supported by the inner wall of the through-bore of the outer supporting member.

11. An optical device comprising:

a ferrule capillary having a through-hole in which an optical fiber is inserted and bonded, both end surfaces of the ferrule capillary being polished so that the end surfaces function as connectors to connect the ferrule capillary to other two optical fiber ferrules, a groove being formed in the ferrule capillary transversely across the optical fiber, and an optical element having various functions being embedded in the groove, a magnet having an inner wall surround the optical member, an outer supporting member having a through-bore for supporting and connecting end portions of the ferrule capillary and end portions of the other two optical fiber ferrules in the through-bore, a pair of slit resilient sleeves in alignment with the through-bore for supporting the end portions of the other two optical fiber ferrules and the ferrule capillary is covered and supported at periphery of the groove having the optical element embedded therein by the inner wall of the magnet which in turn is supported by the inner wall of the bore of the outer supporting member.

12. An optical device comprising:

an optical fiber ferrule having a through-hole in which an optical fiber is inserted and bonded, one end surface of the ferrule being polished so that the end surface functions as a connector to connect the optical fiber ferrule to a second optical fiber ferrule, a groove being formed in the optical fiber ferrule transversely across the optical fiber, an optical element having various functions and a magnet embedded in the groove, and a housing having a through-bore for fitting and supporting one end portion of the optical fiber ferrule, and a semiconductor laser source connected with the optical fiber in the optical fiber ferrule, wherein the one end of the optical fiber ferrule is covered and supported at periphery of the groove having the optical element and the magnet embedded therein by the inner wall of the through-bore of the housing.

13. An optical device comprising:

an optical fiber;

an optical element;

a magnet surrounding the optical fiber;

a ferrule capillary holding the optical fiber and holding the optical element and the magnet in a groove formed transversely across the optical fiber;

a connector formed as a polished surface at one end of the ferrule capillary; and an outer support arranged around the groove for holding the ferrule capillary at the groove as well as around the connector.

* * * * *